United States Patent
Weiner

(10) Patent No.: US 12,509,508 B2
(45) Date of Patent: Dec. 30, 2025

(54) COMPOSITIONS AND METHODS FOR LINEAR AND CONFORMATIONAL SITE-SPECIFIC ANTIBODIES AND METHODS OF MAKING THE SAME

(71) Applicant: AbBraTech Inc., Branford, CT (US)

(72) Inventor: Michael P. Weiner, Guilford, CT (US)

(73) Assignee: ABBRATECH, INC., Branford, CT (US)

( * ) Notice: Subject to any disclaimer, the term of this patent is extended or adjusted under 35 U.S.C. 154(b) by 0 days.

(21) Appl. No.: 17/954,037

(22) Filed: Sep. 27, 2022

(65) Prior Publication Data
US 2023/0212271 A1    Jul. 6, 2023

Related U.S. Application Data

(60) Provisional application No. 63/248,908, filed on Sep. 27, 2021.

(51) Int. Cl.
| | | |
|---|---|---|
| C07K 16/18 | (2006.01) | |
| A61K 39/385 | (2006.01) | |
| C07K 14/18 | (2006.01) | |
| C07K 14/81 | (2006.01) | |
| A61K 39/00 | (2006.01) | |

(52) U.S. Cl.
CPC ............ *C07K 16/18* (2013.01); *A61K 39/385* (2013.01); *C07K 14/18* (2013.01); *C07K 14/8125* (2013.01); *A61K 2039/545* (2013.01); *A61K 2039/6081* (2013.01); *C07K 2317/76* (2013.01); *C07K 2317/92* (2013.01); *C07K 2319/00* (2013.01)

(58) Field of Classification Search
None
See application file for complete search history.

(56) References Cited

U.S. PATENT DOCUMENTS 4,543,439 A * 9/1985 Frackelton, Jr. ....... C07K 16/18
435/948

FOREIGN PATENT DOCUMENTS

| WO | 2000043422 A1 | 7/2000 | |
|---|---|---|---|
| WO | WO-0043422 A1 * | 7/2000 | ............. C07K 16/18 |

OTHER PUBLICATIONS

Kurosawa et al., Scientific Reports, vol. 6, No. 1, Apr. 29, 2016 (Year: 2016).*
Yano et al., Vaccine 23 (2005) 2322-2326 (Year: 2005).*
Alberts et al. Molecular Biology of the Cell. 4th edition. New York: Garland Science; 2002. B Cells and Antibodies. downloaded Jul. 30, 2024 from: https://www.ncbi.nlm.nih.gov/books/NBK26884/ (Year: 2002).*
Chen Longxin et al, "Epitope-directed, antibody selection by site-specific photocrosslinking", Sci. Adv, Jan. 1, 2020 (Jan. 1, 2020), XP093010589, DOI: 10.1126/sciadv.aaz7825 Retrieved from the Internet: URL:https://www.ncbi.nlm.nih.gov/pmc/articles/PMC7112767/pdf/aaz7825.pdf.

(Continued)

*Primary Examiner* — Karl J Puttlitz
(74) *Attorney, Agent, or Firm* — Bryan D. Zerhusen; Nicholas R. Herrel; CANTOR COLBURN, LLP

(57) ABSTRACT

The present disclosure provides a method of making a site-specific antibody to a target of interest.

15 Claims, 16 Drawing Sheets
Specification includes a Sequence Listing.

(56) References Cited

OTHER PUBLICATIONS

Fernandez-Tejada Alberto et al, "Conformational Effects of the Non-natural [alpha]-Methylserine on Small Peptides and Glycopeptides", The Journal of Organic Chemistry, vol. 74, No. 24, Nov. 19, 2009 (Nov. 19, 2009), pp. 9305-9313, XP093010571, ISSN: 0022-3263, DOI: 10.1021/jo901988w.
International Search Report and Written Opinion for PCT/US2022/044863 dated Jan. 9, 2023.
Nobuyuki Kurosawa et al: "Novel method for the high-throughput production of phosphorylation site-specific monoclonal antibodies", Scientific Reports, vol. 6, No. 1, Apr. 29, 2016 (Apr. 29, 2016), XP055364308, DOI: 10.1038/srep25174.

* cited by examiner

CA45 and KZ52 ES/D peptides
mapped to GP1-GP2 interface

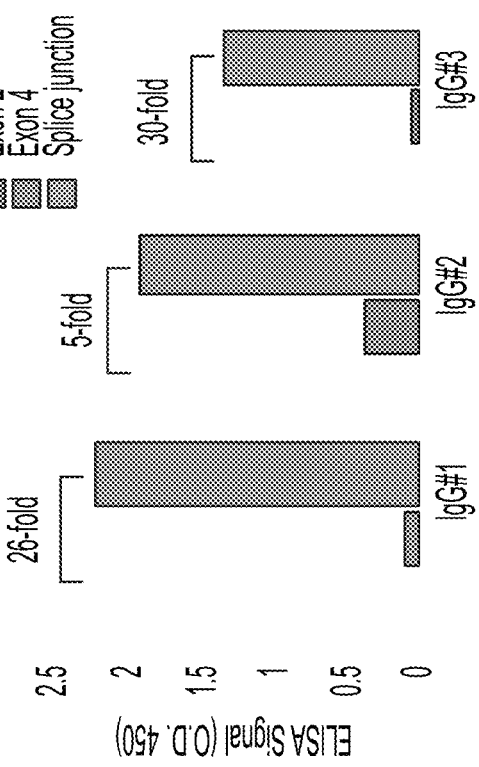
FIG. 6B
CENPA-Δexon3: HLLIRKLPFSRL·AACAFLVHLFEDAYLL
← neojunction
FIG. 6C
Isoform 1: Exon 2 | Exon 3 | Exon 4
Isoform 2: Exon 2 | Exon 4
← neojunction
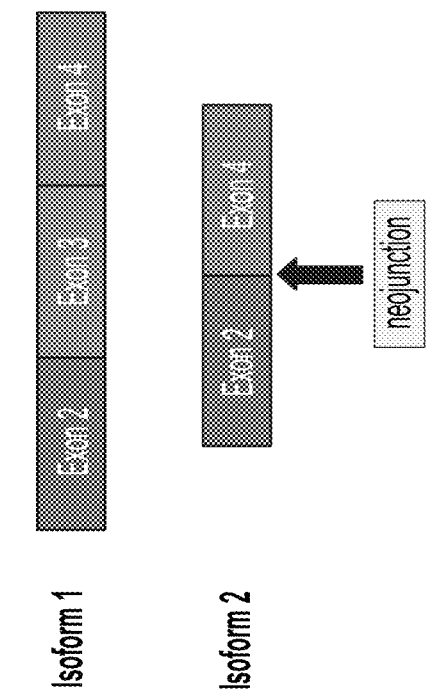
FIG. 6D
■ Exon 2
■ Exon 4
■ Splice junction
FIG. 6E
MPER: KNEQELLEL(D,E)KWASLWNWFNITNWLWYIKLF

| Type of Screen | Library treatment | Peptide on solid substrate | Wash buffer + peptide: | Stringency of wash | Elute from substrate with | End Result Specificity |
|---|---|---|---|---|---|---|
| Discovery | naive library | nnAA peptide | native peptide | mild | nnAA peptide | anti-nnAA |
| DisMat | AXM mut | native peptide | nnAA peptide | mild | native peptide | anti-native |
| AffMat | AXM mut | either nnAA or native | same as peptide on substrate | strong | urea | anti-parental with higher affinity |

FIG. 9
CONTINUED

COMPOSITIONS AND METHODS FOR LINEAR AND CONFORMATIONAL SITE-SPECIFIC ANTIBODIES AND METHODS OF MAKING THE SAME

RELATED APPLICATION

This application claims priority to, and the benefit of, U.S. Application No. 63/248,908, filed on Sep. 27, 2021, the entire contents of which are incorporated herein by reference.

INCORPORATION BY REFERENCE

In compliance with 37 C.F.R. 1.52(e), the sequence information contained in electronic file name: ATZ0004US2_Sequence_Listing_ST26.xml; size 28.2 KB; created on: 26 Jul. 2024, is incorporated herein by reference in its entirety.

FIELD OF THE INVENTION

The present disclosure relates to compositions and methods of targeting and immune response in vivo and in vitro against specific sites in a protein at an amino acid resolution.

BACKGROUND

Monoclonal antibody treatment is an immunotherapy that utilizes a monoclonal antibody (mAb) that binds monospecifically to a molecule, such as a protein, of interest. The therapy seeks to stimulate the subject's immune system to target the molecule of interest and/or the cell or organism molecule of interest is present. While it is possible to create monoclonal antibodies that are specific to any target, some targets are more difficult to obtain high affinity antibodies to and some targets can circumvent antibody binding through, e.g., mutations. For example, rapid mutation of the Human Immunodeficiency Virus envelope glycoprotein and conserved structure being hidden by variable loops, extensive glycosylation, occlusion within the oligomer, and conformational masking results in immune escape and difficulty in developing a therapeutic antibody.

It has been shown that the affinity for a phosphor-specific single-chain variable monoclonal antibody fragment could be improved >20-fold over that of the WT Ab, reaching a picomolar range, when affinity-matured. Further most of the high-affinity variants exhibited cross-reactivity toward the non-phosphorylated target site but not to the phosphorylation site with a scrambled sequence. Rabbits immunized with peptides presented in liposomes, wherein the serine, threonine, and tyrosine residues of the peptides were modified with sulfate, phosphate, or nitrate moieties resulted in high antisera titers directed toward both the modified and unmodified immunogens. These results demonstrate that chemical modifications can increase the immune responses to poorly immunogenic antigens.

As discussed above, there exists in the art an ongoing need for therapeutic antibodies to antigens that are difficult to therapeutically target because of their ability to escape the immune system through amino acid sequence changes or low antigenicity.

SUMMARY OF THE INVENTION

In various aspects, the present disclosure provides an in vivo immunization by immunizing an animal at least once with a modified peptide having an amino acid sequence of about 10 to about 20 amino acids identical to amino acid sequence of a protein of interest except where one internal amino acid has been substituted with a non-native amino acid (nnAA) and boosting the animal at least once with a first unmodified peptide having an core amino acid sequence identical to the modified peptide except where the nnAA has been substituted with the native amino acid (nAA) and has a first N-terminal amino acid sequence and a first C-terminal amino acid sequence that is not native to the protein of interest. Optionally, the methods further include cloning B-cells obtained from the animal; and identifying a B-cell clone that: binds to the first unmodified peptide and a second unmodified peptide having a core amino acid sequence that is identical to the first unmodified peptide and comprising a second N-terminal amino acid sequence and a second C-terminal amino acid sequence that is not native to the protein of interest; and does not bind to the modified peptide. In any aspect or embodiment described herein, the method further comprises identifying a clone that bind to the protein of interest. In other aspects, the method further includes cloning B-cells obtained from the animal; and identifying a B-cell clone that bind to the protein of interest in its native conformation.

In other aspects, the present disclosure provides an in vivo immunization method by immunizing an animal at least once with a first antigen and boosting the animal at least once with a second antigen. The first antigen has a first peptide (M1) having an amino acid sequence of about 10 to about 20 amino acids identical to a first amino acid sequence of a protein of interest (N1) except where one internal amino acid has been substituted with a non-native amino acid (nnAA); and a second peptide (N2) having an amino acid sequence of about 10 to about 20 amino acids identical to a second amino acid sequence of a protein of interest. The first peptide and the second peptide is joined by a linker. Alternatively, the first antigen has a first peptide (M1) having an amino acid sequence of about 10 to about 20 amino acids identical to a first amino acid sequence of a protein of interest (N1) except where one internal amino acid has been substituted with a non-native amino acid (nnAA); and a second peptide (M2) having an amino acid sequence of about 10 to about 20 amino acids identical to a second amino acid sequence of a protein of interest (N2) except where one internal amino acid has been substituted with a non-native amino acid (nnAA). The first peptide and the second peptide are joined by a linker. The second antigen is the peptide of N1 and N2 where N1 and N2 is joined by a linker that is different from linker of the first antigen. Additionally, N-terminal amino acid sequence (NT1) and a C-terminal amino acid sequence (CT1) that is not native to the protein of interest.

Optionally, prior to boosting the animal is immunized at least once with an antigen comprising the peptide of N1 and M2 wherein N1 and M2 is joined by a unique linker. The method further includes cloning B-cells obtained from the animal; and identifying a B-cell clone that binds to a peptide of N1 and N2, wherein N1 and N2 is joined by a unique linker peptide and a N-terminal amino acid sequence (NT2) and unique C-terminal amino acid sequence (CT2) that is not native to the protein of interest; and does not bind to the first antigen or second antigen. The method further includes identifying a clone that bind to the protein of interest.

In some aspects, the first protein of interest and the second protein of interest is the same protein. Alternatively, first protein of interest and the second protein of interest is a different protein The animal is a human, a rabbit, a mouse, a rat, a goat, a cow, a pig, a camelid or a chicken. The animal is a non-human animal and the animal has a human or humanized immune system.

In other aspects, the peptide is administered with an adjuvant such as for example, Complete Freund's Adjuvant (CFA), Incomplete Freund's Adjuvant (IFA), aluminum, monophosphoryl lipid A (MPL) and aluminum salt (ASO4), oil-in-water emulsion, oil-in-water emulsion of squalene (MF59), ASO3 (Vitamin E, Surfactant polysorbate 80, and squalene), MPL and QS-21 in a liposome formulation (AS01), or cytosine phosphoguanine (CpG)

The modified peptide and/or the first unmodified peptide or the first antigen is conjugated to one or more carriers. Carriers include is keyhole limpet hemocyanin (KLH) or ovalbumin.

In a further aspect, the present disclosure provides a method of producing a site directed binding agent to a protein of interest by providing a modified peptide having an amino acid sequence of about 10 to about 20 amino acids identical to an amino acid sequence of a protein of interest except wherein one internal amino acid has been substituted with a non-native amino acid (nnAA); screening the modified peptide against a library; isolating one or more binding agents that bind to the modified peptide; generating a library of clonotypes of the one or more binding agents isolated; screening the library of clonotypes against: the modified peptide and a first unmodified peptide having a core amino acid sequence identical to the modified except where the nnAA has been substituted with the native amino acid (nAA) and has a first N-terminal amino acid sequence and a first C-terminal amino acid sequence that is not native to the protein of interest and isolating a binding agent that bind to both the first unmodified peptide and the modified peptide. The method further includes generating a library of clonotypes of the binding agent screening the library of clonotypes against the modified peptide; the first unmodified peptide; and a second a second unmodified peptide having a core amino acid sequence that is identical to the first unmodified peptide and has a second N-terminal amino acid sequence and a second C-terminal amino acid sequence that is not native to the protein of interest; and isolating a binding agent that bind to the first and second unmodified peptide and does not bind to the modified peptide.

In yet another aspect, the present disclosure provides methods of producing a site directed conformational binding agent to a protein of interest by providing a first peptide (M1) having an amino acid sequence of about 10 to about 20 amino acids identical to a first amino acid sequence of a protein of interest (N1) except where one internal amino acid has been substituted with a non-native amino acid (nnAA); and a second peptide (N2) having an amino acid sequence of about 10 to about 20 amino acids identical to a second amino acid sequence of a protein of interest wherein the first peptide and the second peptide is joined by a linker; screening the M1 against a library; isolating one or more binding agents that bind to M1; generating a library of clonotypes of the binding agents isolated; screening the library of clonotypes M1; and a first peptide having N1 and N2 wherein N1 and N2 is joined by a unique linker and having a N-terminal amino acid sequence (NT1) and a C-terminal amino acid sequence (CT1) that is not native to the protein of interest; isolating a binding agent that bind to: M1, and the first peptide. The method further includes generating a library of clonotypes of the binding agents screening the library of clonotypes against: M1 the first peptide; and a second peptide comprising of N1 and N2, where N1 and N2 is joined by a unique linker peptide and has a second N-terminal amino acid sequence (NT2) and a second C-terminal amino acid sequence (CT2) that is not native to the protein of interest; isolating a binding agent that bind to: M1, the first peptide and the second peptide; or the first peptide and the second peptide.

The display library is an antibody display library and the binding agent is an antibody or antigen binding fragment thereof. The display library is an aptamer display library and the binding agent is an aptamer.

In various methods the nnAA is a non-synonymous amino acid. The nnAA is phosphorylated, acetylated, isocyanated, sulfated, or nitrated. Exemplary nnAA acids include, O-phosphoserine (SEP), phosphotyrosine. or phosphothreonine. The N-terminal or C terminal amino acid sequence is SerGlySer, GlySerGly, GlyGlyGly, or SerSerSer.

Further provided by the invention is a kit including a first compartment having a modified peptide having an amino acid sequence of about 10 to about 20 amino acids identical to amino acid sequence of a protein of interest except where one internal amino acid has been substituted with a non-native amino acid (nnAA); a second compartment having a first unmodified peptide having an core amino acid sequence identical to the modified peptide except where the nnAA has been substituted with the native amino acid (nAA) and has an first N-terminal amino acid sequence and a first C-terminal amino acid sequence that is not native to the protein of interest; a third compartment having a second unmodified peptide having a core amino acid sequence that is identical to the first unmodified peptide and having a second N-terminal amino acid sequence and a second C-terminal amino acid sequence that is not native to the protein of interest; and instructions for use.

Optionally the kit has a fourth compartment containing an adjuvant. In some aspects the modified peptide, the first unmodified peptide, and/or the first modified peptide is conjugated to one or more carriers such as keyhole limpet hemocyanin (KLH) or ovalbumin.

In yet another aspect, the present disclosure provide a kit having a first compartment comprising a first peptide (M1) having an amino acid sequence of about 10 to about 20 amino acids identical to a first amino acid sequence of a protein of interest (N1) except where one internal amino acid has been substituted with a non-native amino acid (nnAA); and a second peptide (M2) having an amino acid sequence of about 10 to about 20 amino acids identical to a second amino acid sequence of a protein of interest (N2) except where one internal amino acid has been substituted with a non-native amino acid (nnAA); wherein the M1 and M2 is joined by a linker; a second compartment comprising peptide of N1 and N2 wherein N1 and N2 is joined by a linker having a N-terminal amino acid sequence (NT1) and a C-terminal CT1 amino acid sequence (CT1) that is not native to the protein of interest; a third compartment having a peptide of N1 and N2, wherein N1 and N2 is joined by a linker peptide and a N-terminal amino acid sequence (NT2) and a second C-terminal amino acid sequence (CT2) that is not native to the protein of interest; and instructions for use. Optionally, the kit further comprising a forth compartment having a peptide (M1) having an amino acid sequence of about 10 to about 20 amino acids identical to a first amino acid sequence of a protein of interest (N1) except where one internal amino acid has been substituted with a non-native amino acid (nnAA); and a second peptide (N2) having an amino acid sequence of about 10 to about 20 amino acids identical to a second amino acid sequence of a protein of interest wherein the M1 and N2 is joined by a linker.

Optionally the kit further includes a fifth compartment having a peptide having an amino acid sequence of about 10 to about 20 amino acids identical to a first amino acid sequence of a protein of interest (N1) and a second peptide (M2) having an amino acid sequence of about 10 to about 20 amino acids identical to a second amino acid sequence of a protein of interest (N2) except where one internal amino acid has been substituted with a non-native amino acid (nnAA); wherein the N1 and M2 is joined by a linker. Additionally, the kit has a sixth compartment having an adjuvant.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the present disclosure may be utilized in numerous combinations, all of which are expressly contemplated by the present description. These additional advantages objects and embodiments are expressly included within the scope of the present disclosure. The publications and other materials used herein to illuminate the background of the present disclosure, and in particular cases, to provide additional details respecting the practice, are incorporated by reference.

BRIEF DESCRIPTION OF THE DRAWINGS

The accompanying drawings, which are incorporated into and form a part of the specification, illustrate several embodiments of the present disclosure and, together with the description, serve to explain the principles of the present disclosure. The drawings are only for the purpose of illustrating an embodiment of the present disclosure and are not to be construed as limiting the present disclosure.

FIG. 2A, FIG. 2B, FIG. 2C, and FIG. 2D is a series of diagrams showing Filoviridae GP as a model system. FIG. 2A shows the Ebola GP protein and domains. The Filoviridae family of enveloped viruses includes two Marburg viruses, Marburg (MARV) and Ravn (RAVV), and five ebolaviruses, Ebola (EBOV), Sudan (SUDV), Bundibugyo (BDBV), Reston (RESTV), and Tai Forest (TAFV). The filovirus surface glycoprotein (GP) is a trimeric structure that drives viral entry into the host cell via a complex mechanism that is only partially understood to this day. The GP monomer protein is composed of a glycan cap (orange), and GP1 (blue) subdomain and the GP2 (green) subdomain that are cleaved prior to viral entry. GP is an excellent candidate for proof of concept because the structure is known, it can be used in both a biochemical assay (as a substrate for furin protease cleavage) and neutralization assays (both pseudoparticles and filoviral), and benchmark monoclonal antibodies are available. FIG. 2B shows the location of subsites on GP1 and GP2 for CA45 and KZ52 monoclonal antibodies. CA45 sites on GP: GP1: 39-42, GP2: 504-556. KZ52 sites on GP: GP1: 42-43, GP2: 505-514 and 549-556. FIG. 2C shows neutralizing monoclonal antibodies to the filovirus GP and their mapped interfaces. The location and binding sites of five neutralizing monoclonal antibodies. Color code: monoclonal antibody CA45, red; monoclonal antibody KZ52, yellow; monoclonal antibody ADII5946, blue; monoclonal antibody c2G4, pink; monoclonal antibody mAB100, cyan. FIG. 2D shows peptides 1, 2, and 3 mapped onto the GP1-GP2 interface. Epitope mapping colors are reflected on the figure (highlighted residues are proposed SEP residues). Peptide 1, GP1: 36-GVIHNSVLQV-45 (SEQ ID NO: 01), peptide is cyan, SEP target site is orange; peptide 2, GP2: 504-IVNAQPKCNPNLHYWTT-520 (SEQ ID NO: 02), peptide is dark blue, SEP target site is purple; peptide 3, GP2: 543-YTEGLMHNQDGLIC-556 (SEQ ID NO: 03), peptide is yellow, SEP site is red.

FIG. 3. is a diagram showing a furin cleavage site in the GP protein. A cleavage event in the GP protein is mediated by furin, resulting in two glycoproteins (GP1 and GP2) linked by disulfide bonding. This furin cleavage site is present in the same position in the GPs of all Ebola viruses, and one is predicted for Marburg viruses, although in a different location (Sanchez).

FIG. 6B is a schematic illustration using Epivolve to target a neojunction by off-setting the targeted amino acid to a +2 position in rabbits. Sequence of a region of CENPA containing the exons ⅔ neo junction (SEQ ID NO: 18).

FIG. 6C is a diagram showing exon ⅔ SEP (alanine, at position +2, shown in red) peptide was used to first immunize rabbits. Then boost with the native peptide. Clones were isolated and tested against the native exon 2, exon 4 and exon ⅔ peptides.

FIG. 6D is a bar chart showing targeted off-set mediated by neojunction-specific IgG clones. Fourteen clones were identified. Three showing specificities to the neo-junction are shown FIG. 6E

The biopanning conditions for initial discovery screens use generally mild selection with increasing number of washes and time of wash between rounds. Phage were eluted with the support-bound peptide or protein. For DisMat- and AffMat biopanning, sub-libraries were made of purified single plasmid clones using AXM mutagenesis. DisMat used the same biopanning conditions as the discovery screen with nnAA peptide added to the wash buffer at increasing concentrations. The DisMat phage were eluted with native peptide. Typically, 3-5 rounds of DisMat were used per clone. AffMat biopanning uses an off-rate selection. In AffMat, the Ag was diluted 100-fold from the initial KD of the parental clone and the peptide on the solid support was added to the wash buffer at empirically determined increasing concentrations. The phage in AffMat were eluted using urea and AffMat was performed on a clone for 3-5 rounds

DETAILED DESCRIPTION

Figure 1:
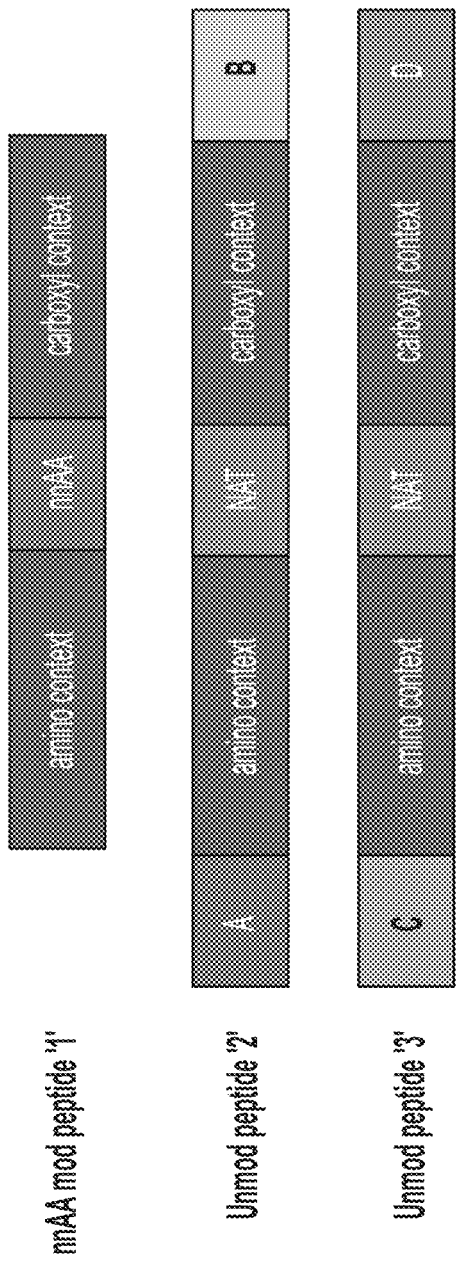
FIG. 1 is a diagram showing the design of an illustrative peptide. The peptide is an approximately 10 to 20 amino acid sequence. For the non-native amino acid containing peptide (peptide 1 or the first peptide), a non-native amino acid (nnAA) or residue was placed roughly in the middle, with a 5-6 amino acid "context" sequence at the amino terminus, and 5-6 amino acid "context" sequence on the carboxyl side. Two unmodified (NATive) peptides (peptides "2" and "3") are also designed: Each of these are synthesized with the same approximately 5-6 amino acids surrounding both sides of the centrally located non-native amino acid or residue. In peptides "2" and "3" the non-native amino acid is replaced with the native amino acid found at that position. Peptides "2" and "3" have two different sequences at the amino and carboxyl ends (these different termini one to differentiate monoclonal antibody binding to the termini of peptide "1", "2" or "3" and binding to the central peptide "3" modified residue). As a tested design, peptide 2 [amino terminus (SerGlySer), carboxyl terminus (GlySerGly)], and for unmodified peptide "3" [amino terminus (GlyGlyGly), carboxyl terminus (SerSerSer)]. Only peptides "1" and "2" are used for immunizations. Peptide "3" is used solely for analysis to differentiate monoclonal antibody binding to the central site from monoclonal antibody binding to a terminus.

The present disclosure is based in part upon the observation that the immune system can readily generate antibodies directed to post-translationally modified proteins. These antibodies are site specific and have been shown to specifically distinguish between a protein having the post translational modification from one without the modification. The present disclosure is based upon the discovery that the immune system ability to generate site specific antibodies (ssAbs) can be exploited to make "site directed antibodies" (sited Abs). Specifically, once ssAbs are generated they can be matured to recognize the naturally occurring amino acid. Surprisingly and unexpectedly, this is not restricted to recognition of the synonymous amino acid. Alternatively, the sited Abs can distinguish between a protein that has been post translationally modified, i.e., glycosylated, from one that has not been modified. More importantly, the sited antibodies can specifically recognize specific glycans, allowing the identification specific glycan type at the glycosylation site.

Thus, the present disclosure describes a method that can consistently target an immune response both in vitro and in vivo against specific sites on a protein at an amino acid resolution, regardless of the target's inherent immunogenicity or of tolerance in vivo. The method which has been termed "Epivolve" allows us to precisely target the immune system against any pre-determined site(s) on a protein target. The method described herein can be used for example, to develop: (i) splice-site specific antibodies; (ii) antibodies that are enzyme inhibitors; (iii) polymorphism-specific antibodies; (iv) in vivo generated antibodies capable of overcoming tolerance; (v) antibodies that are functional agonists antagonists, etc.; (vi) antibodies targeting protein loops of surface exposed proteins and (vii) glycan specific antibodies.

Antibodies developed using the disclosure method have application in a wide variety of fields such as for example, in the development of vaccines, diagnostics, biosimilars, CAR-Ts; therapeutics, bispecific and mutispecific antibodies.

Epivolve is based upon a unique antigen design. The antigens are designed such that they can be used in vivo as an immunogen to first induce a sited specific antibody immune response. Epivolve can be used to generate sited Abs to linear or conformational epitopes.

The epivolve technology starts with the replacement of a native amino acid in an initial peptide or protein immunogen with a specifically modified non-native aa (nnAA). The modified peptide or protein is used in vivo as an immunogen or in vitro as the substrate-bound target for phage display biopanning.

In vivo, epivolve exploits somatic hyper-mutagenesis to produce an antibody that specifically recognize the natural occurring amino acid.

In vitro, clones of Abs biased against the nnAA site and its adjacent context sequence are isolated. In phage display, first the nnAA peptide is biopanned against a naïve Ab "discovery" library to identify nnAA-peptide specific scFvs. These scFv parentals are then epivolved using a method called "discovery maturation" or "DisMat". DisMat uses AXM mutagenesis under our initial discovery conditions against the native peptide or native protein. If needed, these DisMatted Abs can be affinity matured (AffMatted) for higher affinity to the native peptide or protein.

Antibodies produced using the epivolve technology that recognize the naturally occurring amino acid or post translational modification thereof are referred to herein as "sited antibodies"

Additionally, the epivolve antigen design methodology can be utilized to identify any binding agent in a variety of display libraries. For example, epivolve antigens can be screed against aptamer libraries to identify site directed aptamers.

Immunogen Design to Generate Site-Specificity

Site directed antibodies (sited Abs) can be produced against any target site in any protein of interest. The target site can be a linear epitope or a conformational epitope. The target site can be for example, an amino acid, a splice site, or a post-translation modification, such as phosphorylation, glycosylation, ubiquitination, nitrosylation, methylation, acetylation, lipidation or proteolysis. Epivolve works by employing a nonsynonymous non-native amino acid (nnAA) residue in the middle of a peptide antigen as a means of making a "targeted epitope".

Epivolve employs the use of three peptides: a first peptide (the "nnAA peptide"); a second peptide (NATive 2); and a third peptide NATive 3)

nnAA Peptide Design—

The nnAA peptide utilizes a non-naturally occurring amino acid n(nAA) to generate a site-specific immune response. Non naturally occurring amino acids include for example phosphoserine (SEP), phosphothreonine, phosphotyrosine The non-naturally occurring serves as a “pseudohapten” and from it we can derive a nnAA-specific Ab with the foreknowledge that the location of the Ab binding site overlaps or is adjacent to- and directly affected by the nnAA.

The position of the nnAA is dependent upon the specific application of the sited antibody. For example, splice-site specific Abs we found that we had to offset the nnAA to a +/−2 position relative to the splice site (position 0) such that the antibodies can react with amino acids on both sides of the neojunction. Similarly for post-translationally modified—site specific antibodies an offset to +/−1, +/−2 or +/−3 relative to the glycosylation site (position) 0 may be desired.

Preferably, the nnAA is SEP as it is inexpensive to incorporate into synthetic peptides, and in particular a system to incorporate SEP into proteins expressed in *E. coli*. However, other nnAA may be used such as other charged modifications including, but not limited to acetylate, isocyanate, sulfate or nitrate.

The nnAA peptide is approximately a 10-20 amino acid in length. For example, the nnAA peptide is 10, 11, 12, 13, 14, 15, 16, 17, 18, 19 20, or more amino acids in length.

The amino acid sequence of the nnAA peptide is determined by identifying the amino acid or posttranslational modification location (i.e., the target site") in the protein of interest to which it is desired that the sited Ab is to be directed toward. The target site is referred to herein as position 0. Once the target site is identified, the nnAA peptide is produced by replacing the amino acid residue at the target site or at a position offset with respect to the target site with a nnAA. The offset can be −4, −3, −2, −1, +1, +2, +3, +4 relative to the target site “0”. The nnAA is flanked on both sides with context amino acids (i.e. the “context sequence”.) The context sequence represents the amino acid sequence that identical to the amino acid sequence on both sides of the target site or offset position. Depending upon the length of the nnAA peptide, the amino acid terminus and the carboxy terminus context sequence are both about 5, 6, 7, 8, 9 or 10 amino acids in length.

To target a conformational epitope, two nnAA peptides (nnAA1 and nnAA2) each targeting a different portion of the desired epitope is produced. The two are then joined together by a linker to form an nnAA1-nnAA2 peptide In some embodiments, one nnAA peptide (nnAA1) and one nAA peptide (nAA2) is joined by a linker to form a nnAA1-nAA2 peptide.

In other embodiments, one nnAA (nnAA2) peptide and one nAA peptide (nAA1) is joined by a linker to form a nnAA2-nAA1 peptide.

NATive 2 and NATive 3 Peptide Design

NATive 2 is identical to the nnAA except that the modified amino acid is replaced by the nAA (i.e., a nAA peptide) and has 2, 3, 4, 5, or more additional amino acid residues at the both the amino and carboxyl terminus of NATive 2. These additional amino acids do not correspond to the corresponding amino acid of the protein of interest.

NATive 3 is identical to NATive 2 with the exception that the additional amino acid residues at the both the amino and carboxyl terminus are different from NATive 2.

To target confirmation epitopes, the nAA1 and nAA2 peptides are joined together by a linker, that is different from the linker used in the nnAA peptides to form NATive—NATive 2 peptide. The amino and carboxyl terminus of NATive-NATive 2 has 2, 3, 4, 5, or more additional amino acid residues that at do not correspond to the corresponding amino acid of the protein of interest.

Native-Native 3 peptide is formed by joining nAA1 and nAA2 with a different linker from Native-Native 2 and the nnAA peptides. The amino and carboxyl terminus of NATive—NATive 3 peptide has 2, 3, 4, 5, or more additional amino acid residues that at do not correspond to the corresponding amino acid of the protein of interest and are different from that of NATive-NATive 2.

The amino acid sequences at the amino and carboxyl terminus of NATive peptides can be for example SerGlySer, GlySerGly, GlyGlyGly, or SerSerSer.

In any aspect or embodiment described herein, peptides containing the non-naturally occurring amino acid are produced in an organism (bacteria, yeast or mammalian system) capable of incorporating the non-naturally occurring amino acids. Organisms capable of incorporating the non-naturally occurring amino acids are known in the art. For example, by an *E. coli* stain engineering to incorporate a phosphoserine at an amber stop codon, or by an *E. coli* strain that incorporates a modified tyrosine that can be changed to a phosphotyrosine in vitro. This immunogen could be a peptide fragment, a peptide genetically fused to a (really well-expressed) protein, or the full-length protein itself. in a bacterium that is an O-phosphoserine-incorporating suppressing bacterium.

Methods of Producing and Identifying Site Specific Antibodies

Site specific antibodies can be produced in vivo, by immunizing an animal with the nnAA peptides or in vitro by using the nnAA peptides to screen an antibody display library.

An animal is immunized by administering the nnAA peptide, NATive 2 peptide and the protein of interest in its native three-dimensional form (i.e., folded form) (referred to herein as NP).

In any aspect or embodiment described herein, nnAA peptide, NATive 2 peptide or the NP or combination thereof, is administered with or conjugated to one or more (e.g., 1, 2, 3, 4, 5, or more) carriers (e.g., a carrier protein or peptide, such as keyhole limpet hemocyanin (KLH), ovalbumin, or both).

In any aspect or embodiment described herein, immunizing an animal comprises either: (i) administering the nnAA peptide at least once (e.g., one, two, three or more times), the NATive2 at least once (e.g., one, two, three or more times), separately or simultaneously Optionally the NP is administered at least once ((e.g., one, two, three or more times) after nnAA peptide and the NATive2 peptide In any aspect or embodiment described herein, each immunization/administration (e.g., the nnAA peptide, the NATive 2 peptide, the NP (when administered), is administered at least two weeks apart (e.g., each is administered two weeks to 6 months apart from the prior administration and the subsequent administration).

In any aspect or embodiment described herein, the nnAA peptide, the NATive 2 peptide, the NP, or a combination thereof, is administered with an adjuvant (e.g., Complete Freund's Adjuvant (CFA), Incomplete Freund's Adjuvant (IFA), aluminum, monophosphoryl lipid A (MPL) and aluminum salt (ASO4), oil-in-water emulsion, oil-in-water emulsion of squalene (MF59), ASO3 (Vitamin E, Surfactant polysorbate 80, and squalene), MPL and QS-21 in a liposome formulation (AS01), cytosine phosphoguanine (CpG), or a combination thereof).

The animal is for example, a primate, (human or non-human primate) a rabbit, a chicken, a rat, a goat, cow, pig or a mouse. In some aspects the animal is a non-human animal that has a human or humanized immune system.

In any aspect or embodiment described herein, the method further comprises after immunizing (e.g., 5, 6, 7, 8, 9, 10, 11, 12, 13, 14, 15, 16, 17, 18, 19, 20, or more days post final immunization) B-cells are obtained and isolated from the animal. B-cell may be isolated and peripheral blood mononuclear cells (PBMCs), spenocytes. bone marrow, or any lymphoid tissue known to contain B-cells. The B-cells are cloned by any method know in the art.

B-cell clones producing the ssAb of interest are identified by selecting mAbs that do not bind to an appropriate set of negative controls (typically a scrambled peptide sequence and any carrier protein(s) used in the immunizations) and bind specifically to nnAA peptide NATive 2 peptide and, NATive 3 peptide are presumed to be binding to the common amino acid central core. Additionally, because they bind both nnAA and unmodified peptides NATive 2 peptide and, NATive 3 peptide they are deemed "nnAA-status independent". mAbs that bind to both unmodified NATive 2 peptide and, NATive 3 peptide" and not to nnAA peptide" are deemed to be binding to the central core but are "native-sequence specific"

In any aspect or embodiment described herein, ssAbs are from a phage display library, by sequentially screening the library for binding to nnAA peptide NATive 2 peptide and, NATive 3 peptide, followed by generating a library of clonotypes are presumed to be binding to the common amino acid central core.

In any aspect or embodiment described herein, preparing the one or more monoclonal antibodies includes: (i) sequencing the heavy and light chain of the ssAb antibody identified by the methods herein (ii) cloning the ss Ab heavy chain and light chain in an expression plasmid; (iii) expressing the ssAb expression plasmid (iv) purifying the expressed ssAb.

In any aspect or embodiment described herein, detecting the binding capacity of an antibody produced by the methods described herein (e.g., specific binding) is determined by methods well known in the art. For example, by enzyme-linked immunosorbent assay (ELISA) (such as titration ELISA), flowcytometry, surface plasmon resonance (SPR, such as Biacore™) bio-layer interferometry (BLI, such as Octet Red), or a combination thereof.

Methods of Using Site Specific Antibodies

It would be readily apparent to one skilled in the art that the ssAbs produced by the methods described herein are useful in a variety of diagnostic and therapeutic applications. For example, in the development of vaccines, diagnostics, biosimilars, CAR-Ts; therapeutics, bispecific and mutispecific antibodies.

A further aspect of the present disclosure provides a method of treating, preventing or ameliorating at least one symptom of a disease or disorder (e.g., pneumonia, a viral infection, abacterial infection, a coronoavirus infection such as COVID-19, an HIV invention, an ebolavirus infection, such as Ebola virus (EBOV) infection, Sudan virus (SUDV) infection, Bundibugyo virus (BDBV) infection, Reston virus (RESTV) infection, Tai Forest virus (TAFV) infection, etc.) in a subject in need thereof. The method comprises: providing a subject in need thereof; and administering an effective amount of the pharmaceutical composition or formulation described herein, wherein the antibody effectuates the prevention, treatment, or amelioration of at least one symptom of the disease or disorder.

The ssAbs can be used to produce pharmaceutical compositions or formulations. Pharmaceutical compositions or formulations described herein further comprises an effective amount of an excipient or carrier (e.g., an effective amount of a pharmaceutically acceptable carrier). As used herein the language "pharmaceutically acceptable carrier" is intended to include any and all solvents, dispersion media, coatings, antibacterial and antifungal agents, isotonic and absorption delaying agents, and the like, compatible with pharmaceutical administration. The use of such media and agents for pharmaceutically active substances is well known in the art. Except insofar as any conventional media or agent is incompatible with the antibody, use thereof in the compositions is contemplated. Supplementary active compounds can also be incorporated into the compositions.

The description provides methods for preparing pharmaceutical compositions or formulations. Such methods comprise formulating an effective amount of a pharmaceutically acceptable carrier with one or more antibody as described herein. Such compositions or formulations can further include additional active agents as described above. Thus, the present disclosure further describes methods for preparing a pharmaceutical composition or formulation.

A pharmaceutical composition or formulation of the present disclosure is formulated to be compatible with its intended route of administration. Examples of routes of administration include parenteral, e.g., intravenous, intradermal, subcutaneous, intramuscular, intraperitoneal, intranodal, and intrasplenic administration. Solutions or suspensions used for parenteral, intradermal, or subcutaneous application can include the following components: a sterile diluent such as water for injection, saline solution, fixed oils, polyethylene glycols, glycerine, propylene glycol or other synthetic solvents; antibacterial agents such as benzyl alcohol; antioxidants such as ascorbic acid or sodium bisulfate; chelating agents such as ethylenediamine-tetraacetic acid; buffers such as acetates, citrates or phosphates and agents for the adjustment of tonicity such as sodium chloride or dextrubinrubi. pH can be adjusted with acids or bases, such as hydrochloric acid or sodium hydroxide. The parenteral preparation can be enclosed in ampules, disposable syringes or multiple dose vials made of glass or plastic.

Pharmaceutical compositions or formulations suitable for injectable use include sterile aqueous solutions (where water soluble) or dispersions and sterile powders for the extemporaneous preparation of sterile injectable solutions or dispersions. For intravenous administration, suitable carriers include physiological saline, bacteriostatic water, Cremophor EL (BASF; Parsippany, N.J.) or phosphate buffered saline (PBS). In all cases, the composition or formulation must be sterile and should be fluid to the extent that easy syringability exists. It must be stable under the conditions of manufacture and storage and must be preserved against the contaminating action of microorganisms such as bacteria and fungi. The carrier can be a solvent or dispersion medium containing, for example, water, ethanol, polyol (for example, glycerol, propylene glycol, and liquid polyethylene glycol, and the like), and suitable mixtures thereof. The proper fluidity can be maintained, for example, by the use of a coating such as lecithin, by the maintenance of the required particle size in the case of dispersion and by the use of surfactants. Prevention of the action of microorganisms can be achieved by various antibacterial and antifungal agents, for example, chlorobutanol, phenol, ascorbic acid, and the like. In many cases, it will be preferable to include isotonic agents, for example, sugars, polyalcohols such as mannitol, sorbitol, or sodium chloride in the composition or formulation. Prolonged absorption of the injectable compositions or formulations can be brought about by including in the composition or formulation an agent which delays absorption, for example, aluminum monostearate and gelatin.

Sterile injectable solutions can be prepared by incorporating the active compound (e.g., a polypeptide or antibody) in the required amount in an appropriate solvent with one or a combination of ingredients enumerated above, as required, followed by filtered sterilization. Generally, dispersions are prepared by incorporating the active compound into a sterile vehicle which contains a basic dispersion medium, and then incorporating the required other ingredients from those enumerated above. In the case of sterile powders for the preparation of sterile injectable solutions, the preferred methods of preparation are vacuum drying and freeze-drying which yields a powder of the active ingredient plus any additional desired ingredient from a previously sterile-filtered solution thereof.

It is especially advantageous to formulate parenteral compositions or formulations in dosage unit form for ease of administration and uniformity of dosage. Dosage unit form as used herein refers to physically discrete units suited as unitary dosages for the subject to be treated; each unit containing a predetermined quantity of active compound calculated to produce the desired therapeutic effect in association with the required pharmaceutical carrier. The specification for the dosage unit forms of the present disclosure are dictated by and directly dependent on the unique characteristics of the antibody and the particular therapeutic effect to be achieved, and the limitations inherent in the art of compounding such an antibody for the treatment of subjects.

In any aspect or embodiment of the methods provided herein, the method can further include the step of administering a dosage from about 100 ng to about 200 mg of a therapeutic or pharmaceutical composition or formulation as described herein. In any aspect or embodiment described herein, e.g., in human, the pharmaceutical composition or formulation as described herein may contain mannitol as carrier, and the composition or formulation is administered from 10 μg to 200 mg, preferably 20 to 100 mg, in a single administration.

Preferred pharmaceutically acceptable carriers can comprise, for example, xanthan gum, locust bean gum, galactose, other saccharides, oligosaccharides and/or polysaccharides, starch, starch fragments, dextrins, British gum and mixtures thereof. Advantageously, the pharmaceutically acceptable carrier is of natural origin. The pharmaceutically acceptable carrier can be, or can further comprise, an inert saccharide diluent selected from a monosaccharide or disaccharide. Advantageous saccharide is mannitol.

In any aspect or embodiment described herein, the composition further comprises at least one stabilizer (e.g., one or more of salt(s), saccharide(s), and/or amino acid(s)). In any aspect or embodiment described herein, the composition further comprises at least one surfactant. In any aspect or embodiment described herein, the composition further comprises at least one buffering agent.

The term "surfactant" as used herein refers to a pharmaceutically acceptable, surface-active agent. For example, a non-ionic surfactant can be used. Examples of pharmaceutically acceptable surfactants include, but are not limited to, polyoxyethylen-sorbitan fatty acid esters (Tween), polyoxyethylene alkyl ethers (Brij), alkylphenylpolyoxyethylene ethers (Triton X), polyoxyethylenepolyoxypropylene copolymers (Poloxamer, Pluronic), and sodium dodecyl sulphate (SDS). Preferred polyoxyethylene-sorbitan fatty acid esters are polysorbate 20 (polyoxyethylene sorbitan monolaureate, sold under the trademark Tween 20™) and polysorbate 80 (polyoxyethylene sorbitan monooleate, sold under the trademark Tween 80™). Preferred polyethylene-polypropylene copolymers are those sold under the names Pluronic® F68 or Poloxamer188™. Preferred polyoxyethylene alkyl ethers are those sold under the trademark Brij™. Preferred alkylphenylpolyoxyethylene ethers are sold under the tradename Triton X, most preferred is p-tert-octylphenoxy polyethoxyethanol (sold under the tradename Triton X-100™) Preferred surfactants for use in the present invention are polyoxyethylen-sorbitan fatty acid esters, preferably polysorbate 20 or polysorbate 80, most preferably polysorbate 20. Another preferred surfactant is Poloxamer 188™.

The term "buffering agent" as used herein refers to a pharmaceutically acceptable excipient, which stabilizes the pH of a pharmaceutical preparation. Suitable buffers are well known in the art and can be found in the literature. In any aspect or embodiment described herein, pharmaceutically acceptable buffers comprise, but are not limited to histidine-buffers, citrate-buffers, succinate-buffers, acetate-buffers, arginine-buffers, phosphate-buffers, or mixtures thereof. Buffering agents are thus histidine salts, citrate salts, succinate salts, acetate salts, malate salts, phosphate salts and lactate salts. Buffering agents of particular interest comprise L-histidine or mixtures of L-histidine and L-histidine hydrochloride or L-histidine acetate with pH adjustment with an acid or a base known in the art. In any aspect or embodiment described herein, the above-mentioned buffers are used in an amount of about 5 mM to about 100 mM, particularly of about 10 mM to about 30 mM, and more particularly of about 20 mM. Independently from the buffer used, in any aspect or embodiment describe herein, the pH can be adjusted to a value in the range from about 4.5 to about 7.0, and particularly to a value in the range from about 5.0 to about 6.0, and most particularly to pH 6.0.+−0.0.03 with an acid or a base known in the art, e.g. hydrochloric acid, acetic acid, phosphoric acid, sulfuric acid and citric acid, sodium hydroxide and potassium hydroxide.

The term "stabilizer" as used herein refers to a pharmaceutical acceptable excipient, which protects the active pharmaceutical ingredient and/or the formulation from chemical and/or physical degradation during manufacturing, storage and application. In any aspect or embodiment described herein, stabilizers include, but are not limited to, saccharides, amino acids, polyols (e.g. mannitol, sorbitol, xylitol, dextran, glycerol, arabitol, propylene glycol, polyethylene glycol), cyclodextrines (e.g. hydroxypropyl-.beta.-cyclodextrine, sulfobutyl-ethyl-.beta.-cyclodextrine, .beta.-cyclodextrine), polyethylenglycols (e.g. PEG 3000, PEG 3350, PEG 4000, PEG 6000), albumines (human serum albumin (HSA), bovine serum albumin (BSA)), salts (e.g. sodium chloride (saline), magnesium chloride, calcium chloride), and/or chelators (e.g. EDTA). In any aspect or embodiment described herein, the stabilizer is selected from the group consisting of saccharides, polyols, and amino acids. In any aspect or embodiment described herein, the one or more stabilizers is present in the formulation in an amount of about 10 mM to about 500 mM, particularly in an amount of about 140 to about 250 mM, and more particularly in an amount of about 210 mM to about 240 mM. For example, in any aspect or embodiment described herein, sucrose or trehalose are used as stabilizers in an amount of about 220 mM to about 240 mM.

The term "saccharide" as used herein includes monosaccharides and oligosaccharides. A monosaccharide is a monomeric carbohydrate which is not hydrolysable by acids, including simple sugars and their derivatives, e.g., aminosugars. Saccharides are usually in their D conformation. Examples of monosaccharides include glucose, fructose, galactose, mannose, sorbose, ribose, deoxyribose, neuraminic acid. An oligosaccharide is a carbohydrate consisting of more than one monomeric saccharide unit connected via glycosidic bond(s) either branched or in a linear chain. The monomeric saccharide units within an oligosaccharide can be identical or different. Depending on the number of monomeric saccharide units the oligosaccharide is a di-, tri-, tetra- penta- and so forth saccharide. In contrast to polysaccharides the monosaccharides and oligosaccharides are water soluble. Examples of oligosaccharides include sucrose, trehalose, lactose, maltose and raffinose. Preferred saccharides for use in the present invention are sucrose and trehalose (i.e., α,α-D-trehalose), most preferred is sucrose. Trehalose is available as trehalose dihydrate. In any aspect or embodiment described herein, the at least one saccharide(s) can be present in the formulation in an amount of about 10 to about 500 mM, preferably in an amount of about 200 to about 300 mM, more preferably in an amount of about 220 to about 250 mM, particularly an amount of about 220 mM or about 240 mM, most preferably in an amount of about 220 mM.

The term "amino acid" as used herein as a stabilizer refers to a pharmaceutically acceptable organic molecule possessing an amino moiety located at a-position to a carboxylic group. In any aspect or embodiment described herein, the amino acid is one or more of arginine, glycine, ornithine, lysine, histidine, glutamic acid, asparagic acid, isoleucine, leucine, alanine, phenylalanine, tyrosine, tryptophane, methionine, serine, and proline. In any aspect or embodiment described herein, the amino acid employed is the L-form. Basic amino acids, such as arginine, histidine, or lysine, are preferably employed in the form of their inorganic salts (advantageously in the form of the hydrochloric acid salts, i.e., as amino acid hydrochlorides). In any aspect or embodiment descried herein, the amino acid is methionine. In any aspect or embodiment described herein, the amino acid (such as methionine) is used at a concentration of about 5 to about 25 mM or about 10 mM.

In any aspect or embodiment described herein, the stabilizer includes or is one or more lyoprotectant. The term "lyoprotectant" as used herein refers to a pharmaceutically acceptable excipients, which protect the labile active ingredient (e.g., a protein) against destabilizing conditions during the lyophilisation process, subsequent storage and reconstitution. In any aspect or embodiment described herein, the lyoprotectants comprise, but are not limited to, the group consisting of saccharides, polyols (such as e.g., sugar alcohols), and amino acids. In any aspect or embodiment described herein, the one or more lyoprotectant is selected from the group consisting of saccharides such as sucrose, trehalose, lactose, glucose, mannose, maltose, galactose, fructose, sorbose, raffinose, neuraminic acid, amino sugars such as glucosamine, galactosamine, N-methylglucosamine ("Meglumine"), polyols such as mannitol and sorbitol, and amino acids such as arginine and glycine, or mixtures thereof. In any aspect or embodiment described herein, the one or more lyoprotectant is used in an amount of about 10 to 500 mM, preferably in an amount of about 10 to about 300 mM and more preferably in an amount of about 100 to about 300 mM.

In any aspect or embodiment described herein, the stabilizer includes or is one or more antioxidant. The term "antioxidant" as used herein refers to a pharmaceutically acceptable excipient, which prevent oxidation of the active pharmaceutical ingredient. In any aspect or embodiment described herein, the one or more antioxidant comprises, but are not limited to, ascorbic acid, gluthathione, cysteine, methionine, citric acid, and EDTA. In any aspect or embodiment described herein, the one or more antioxidant is used in an amount of about 0.01 to about 100 mM, preferably in an amount of about 5 to about 50 mM and more preferably in an amount of about 5 to about 25 mM.

In any aspect or embodiment described herein, the compositions or formulations described herein further comprise one or more tonicity agents. The term "tonicity agents" as used herein refers to pharmaceutically acceptable excipients used to modulate the tonicity of the formulation. The formulation can be hypotonic, isotonic or hypertonic. Isotonicity in general relates to the osmotic pressure of a solution, usually relative to that of human blood serum (around 250-350 mOsmol/kg). The formulation according to the present disclosure can be hypotonic, isotonic or hypertonic, but will preferably be isotonic. In any aspect or embodiment described herein, an isotonic formulation is liquid or liquid reconstituted from a solid form, e.g. from a lyophilized form, and denotes a solution having the same tonicity as some other solution with which it is compared, such as physiologic salt solution and the blood serum. In any aspect or embodiment described herein, the one or more tonicity agents includes or is selected from sodium chloride, potassium chloride, glycerine and any component from the group of amino acids or sugars, in particular glucose. In any aspect or embodiment described herein, the one or more tonicity agents is used in an amount of about 5 mM to about 500 mM. Within the stabilizers and tonicity agents there is a group of compounds which can function in both ways, i.e. they can at the same time be a stabilizer and a tonicity agent. Examples thereof can be found in the group of sugars, amino acids, polyols, cyclodextrines, polyethyleneglycols and salts. An example for a sugar which can at the same time be a stabilizer and a tonicity agent is trehalose.

The term "polyols" as used herein denotes pharmaceutically acceptable alcohols with more than one hydroxy group. In any aspect or embodiment described herein, the one or more polyols is selected from mannitol, sorbitol, glycerine, dextran, glycerol, arabitol, propylene glycol, polyethylene glycol, and combinations thereof. In any aspect or embodiment described herein, the one or more polyols is used in an amount of about 10 mM to about 500 mM, particularly in an amount of about 10 to about 250 mM and more particularly in an amount of about 200 to about 250 mM.

In any aspect or embodiment described herein, the composition or formulations described herein may further includes an adjuvant (such as preservatives, wetting agents, emulsifying agents and dispersing agents). Prevention of presence of microorganisms may be ensured both by sterilization procedures, and by the inclusion of various antibacterial and antifungal agents, e.g., paraben, chlorobutanol, phenol, sorbic acid, and the like. In any aspect or embodiment described herein, the one or more preservative is used in an amount of about 0.001 to about 2% (w/v). In any aspect or embodiment described herein, the one or more preservative is selected from ethanol, benzyl alcohol, phenol, m-cresol, p-chlor-m-cresol, methyl or propyl parabens, benzalkonium chloride.

Advantageously, the present disclosure relates to a pharmaceutical composition or formulation as defined above, which is in the form of a liposome, or nano particles, or in the form of a solution. An advantageous solution is a solution comprising from 1 to 15%, in particular about 10% of mannitol. The solution should be iso-osmolar.

Definitions

Unless otherwise defined, all technical and scientific terms used herein have the same meaning as commonly understood by one of ordinary skill in the art to which this disclosure belongs. The terminology used in the description is for describing particular embodiments only and is not intended to be limiting of the present disclosure.

Where a range of values is provided, it is understood that each intervening value, to the tenth of the unit of the lower limit unless the context clearly dictates otherwise, between the upper and lower limit of that range and any other stated or intervening value in that stated range is encompassed within the present disclosure. The upper and lower limits of these smaller ranges which may independently be included in the smaller ranges is also encompassed within the present disclosure, subject to any specifically excluded limit in the stated range. Where the stated range includes one or both of the limits, ranges excluding either both of those included limits are also included in the present disclosure.

As used herein, the following terms may have meanings ascribed to them below, unless specified otherwise. However, it should be understood that other meanings that are known or understood by those having ordinary skill in the art to which the present disclosure belongs are also possible, and within the scope of the present disclosure.

It must be noted that as used herein and in the appended claims, the singular forms "a", "and", and "the" include plural references (i.e., refer to one or to more than one or at least one) to the grammatical object of the article. By way of example, "an element" means one element or more than one element.

The term "about" as it is used herein, in association with numeric values or ranges, reflects the fact that there is a certain level of variation that is recognized and tolerated in the art due to practical and/or theoretical limitations. For example, minor variation is tolerated due to inherent variances in the manner in which certain devices operate and/or measurements are taken. In accordance with the above, the phrase "about" is normally used to encompass values within the standard deviation or standard error.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, in certain methods described herein that include more than one step or act, the order of the steps or acts of the method is not necessarily limited to the order in which the steps or acts of the method are recited unless the context indicates otherwise.

The term "antibody" as used herein in the specification and claims includes whole antibodies and any antigen binding fragment (i.e., "antigen-binding portion") or single chains thereof. For example, in any aspect or embodiment described herein "antibody" as used herein in the specification and claims refers to a protein or immunoglobulin comprising at least two heavy chains (H chains) and two light chains (L chains) connected or stabilized by disulfide bonds. Each heavy chain is comprised of a heavy chain variable region ($V_H$) and a heavy chain constant region ($C_H$). Each light chain is comprised of a light chain variable region ($V_L$) and a light chain constant region ($C_L$). The heavy chain-constant region comprises three heavy chain-constant domains ($C_{H1}$, $C_{H2}$, and $C_{H3}$) or four heavy chain-constant domains (IgM-type or IgE-type antibodies; $CH_1$, $C_{H2}$, $C_{H3}$ and $C_{H4}$) wherein the first constant domain $C_{H1}$ is adjacent to the variable region and may be connected to the second constant domain $CH_2$ by a hinge region. The light chain-constant region consists only of one constant domain. The variable regions can be further subdivided into regions of hypervariability, termed complementarity determining regions (CDRs), interspersed with regions that are more conserved, termed framework regions (FR), wherein each variable region comprises three CDRs (CDR1, CDR2, and CDR3) and four FRs (FR1, FR2, FR3, and FR4), arranged from amino-terminus to carboxy-terminus in the following order: FR1, CDR1, FR2, CDR2, FR3, CDR3, FR4. The constant regions of the antibodies can mediate the binding of the immunoglobulin to host tissues or factors, including various cells of the immune system (e.g., effector cells) and the first component (C1q) of the classical complement system. The variable regions of the heavy and light chains contain a binding domain that interacts with an antigen. The heavy chain constant regions may be of any type, such as γ-, δ-, α-, μ- or ε-type heavy chains. In any aspect or embodiment described herein, the heavy chain constant region of the antibody is a γ-chain. Furthermore, the light chain constant region may also be of any type, such as κ-type light chain or λ-type light chain. In any aspect or embodiment, the light chain constant region of the antibody is a κ-chain.

The terms "γ-(δ-, α-, μ- or ε-) type heavy chain" and "κ-(λ-) type light chain" refer to antibody heavy chains or antibody light chains, respectively, which have constant region amino acid sequences derived from naturally occurring heavy or light chain constant region amino acid sequences, especially human heavy or light chain constant region amino acid sequences. In particular, the amino acid sequence of the constant domains of a γ-type (especially γ1-type) heavy chain is at least 95%, especially at least 98%, identical to the amino acid sequence of the constant domains of a human γ (especially the human γ1) antibody heavy chain. Furthermore, the amino acid sequence of the constant domain of a κ-type light chain is in particular at least 95%, especially at least 98%, identical to the amino acid sequence of the constant domain of the human K antibody light chain. The constant regions of the antibodies may mediate the binding of the immunoglobulin to host tissues or factors, including various cells of the immune system (e.g., effector cells) and the first component (C1q) of the classical complement system. The antibody can be e.g. a humanized, human, or chimeric antibody.

The term "isotype" as used herein in the specification and claims refers to the antibody class (e.g., IgG, IgD, IgA, IgM, or IgE) that is encoded by the heavy chain constant region genes (γ-, δ-, α-, μ- or ε-heavy chain constant genes, respectively).

The antigen-binding portion of an antibody as used herein in the specification and claims usually refers to full length or one or more fragments of an antibody that retains the ability to specifically bind to an antigen. It has been shown that the antigen-binding function of an antibody can be performed by fragments of a full-length antibody. Examples of binding fragments of an antibody include a Fab fragment, a monovalent fragment consisting of the $V_L$, $V_H$, $C_L$ and $C_{H1}$ domains; a F(ab)$_2$ fragment, a bivalent fragment comprising two Fab fragments, each of which binds to the same antigen, linked by a disulfide bridge at the hinge region; a Fd fragment consisting of the $V_H$ and $C_{H1}$ domains; a Fv fragment consisting of the $V_L$ and $V_H$ domains of a single arm of an antibody; and a dAb fragment, which consists of a $V_H$ domain.

The term "Fab part" as used herein in the specification and claims refers to a part of the antibody comprising the heavy and light chain variable regions ($V_H$ and $V_L$) and the first domains of the heavy and light chain constant regions ($C_{H1}$ and $C_L$). In cases where the antibody does not comprise all of these regions, then the term "Fab part" only refers to those of the regions $V_H$, $V_L$, $C_{H1}$ and $C_L$ which are present in the antibody. In certain embodiments, "Fab part" refers to that part of an antibody corresponding to the fragment obtained by digesting a natural antibody with papain which contains the antigen binding activity of the antibody. In particular, the Fab part of an antibody encompasses the antigen binding site or antigen binding ability thereof. For example, the Fab part comprises at least the $V_H$ region of the antibody.

The term "Fc part" as used herein in the specification and the claims is a part of the antibody comprising the heavy chain constant regions 2, 3 and—where applicable—4 ($C_{H2}$, $C_{H3}$ and $C_{H4}$). In particular, the Fc part comprises two of each of these regions. In cases where the antibody does not comprise all of these regions, then the term "Fc part" only refers to those of the regions $O_{H2}$, $H_3$ and $C_{H4}$ which are present in the antibody. Preferably, the Fc part comprises at least the $C_H2$ region of the antibody. Preferably, "Fc part" refers to that part of an antibody corresponding to the fragment obtained by digesting a natural antibody with papain which does not contain the antigen binding activity of the antibody. In particular, the Fc part of an antibody is capable of binding to the Fc receptor and thus, e.g. comprises an Fc receptor binding site or an Fc receptor binding ability.

The term "antibody" as used herein in the specification and claims, refer in certain embodiments to a population of antibodies of the same kind. In particular, all antibodies of the population exhibit the features used for defining the antibody. In certain embodiments, all antibodies in the population have the same amino acid sequence.

The term "antibody" as used herein in the specification and claims also includes fragments and derivatives of said antibody. A "fragment or derivative" of an antibody as used herein in the specification and claims is a protein or glycoprotein which is derived from said antibody and is capable of binding to the same antigen, in particular to the same epitope as the antibody. Thus, a fragment or derivative of an antibody herein generally refers to a functional fragment or derivative. In any aspect or embodiment described herein, the fragment or derivative of an antibody comprises a heavy chain variable region. It has been shown that the antigen-binding function of an antibody can be performed by fragments of a full-length antibody or derivatives thereof. Examples of fragments of an antibody include (i) Fab fragments, monovalent fragments consisting of the variable region and the first constant domain of each the heavy and the light chain; (ii) F(ab)$_2$ fragments, bivalent fragments comprising two Fab fragments linked by a disulfide bridge at the hinge region; (iii) Fd fragments consisting of the variable region and the first constant domain $C_{H1}$ of the heavy chain; (iv) Fv fragments consisting of the heavy chain and light chain variable region of a single arm of an antibody; (v) scFv fragments, Fv fragments consisting of a single polypeptide chain; (vi) (Fv)$_2$ fragments consisting of two Fv fragments covalently linked together; (vii) a heavy chain variable domain; and (viii) multibodies consisting of a heavy chain variable region and a light chain variable region covalently linked together in such a manner that association of the heavy chain and light chain variable regions can only occur intermolecular but not intramolecular. In any aspect or embodiment described herein, derivatives of an antibody include antibodies that bind to or compete with the same antigen as the parent antibody, but which have a different amino acid sequence than the parent antibody from which it is derived. These antibody fragments and derivatives are obtained using conventional techniques known to those with skill in the art, and the fragments are screened for utility in the same manner as are intact antibodies. The term "chimeric antibody" as used herein in the specification and claims is an antibody having a heavy chain variable region and a light chain variable region from one species linked to a heavy chain constant region and a light chain constant region from a different species, respectively (e.g., combining genetic material from a nonhuman source with genetic material from a human being).

The term "human antibody" as used herein in the specification and claims includes antibodies having variable regions in which both the FR and CDR regions are derived from human germline immunoglobulin sequences. Furthermore, if the antibody contains a constant region, the constant region also is derived from human germline immunoglobulin sequences. The human antibodies of the present disclosure can include amino acid residues not encoded by human germline immunoglobulin sequences (e.g., mutations introduced by random or site-specific mutagenesis in vitro or by somatic mutation in vivo). However, the term "human antibody" as used herein the specification and claims does not include antibodies in which CDR sequences derived from the germline of another mammalian species have been grafted onto human framework sequences.

The term "mouse antibody" as used herein in the specification and claims includes antibodies having variable regions in which both the FR and CDR regions are derived from mouse germline immunoglobulin sequences. Furthermore, if the antibody contains a constant region, the constant region also is derived from mouse germline immunoglobulin sequences. The mouse antibodies of the present disclosure can include amino acid residues not encoded by mouse germline immunoglobulin sequences (e.g., mutations introduced by random or site-specific mutagenesis in vitro or by somatic mutation in vivo). However, the term "mouse antibody" as used herein in the specification and claims does not include antibodies in which CDR sequences derived from the germline of another mammalian species have been grafted onto mouse framework sequences.

The term "rabbit antibody" as used herein in the specification and claims includes antibodies having variable regions in which both the FR and CDR regions are derived from mouse germline immunoglobulin sequences. Furthermore, if the antibody contains a constant region, the constant region also is derived from mouse germline immunoglobulin sequences. The mouse antibodies of the invention can include amino acid residues not encoded by mouse germline immunoglobulin sequences (e.g., mutations introduced by random or site-specific mutagenesis in vitro or by somatic mutation in vivo). However, the term "mouse antibody" as used in the specification and claims does not include antibodies in which CDR sequences derived from the germline of another mammalian species have been grafted onto mouse framework sequences.

The term "humanized antibody" as used herein in the specification and claims refers to an antibody from non-human species whose protein sequences have been modified to increase similarity to antibody variants produced naturally in humans, such as an amino acid sequence characteristic of an antibody derived from a non-human has replaced a corresponding position of a human antibody. Examples of the humanized antibody include an antibody having heavy chain CDR1 to CDR3 and light chain CDR1 to CDR3 derived from an antibody prepared from a non-human antibody and in which all other regions comprising respective four framework regions (FRs) of the heavy chain and the light chain are derived from a human antibody. Such an antibody may be referred to as a CDR-grafted antibody. The term "humanized antibody" may include a human chimeric antibody. A "human chimeric antibody" is an antibody based on an antibody derived from a non-human in which a constant region of the antibody derived from a non-human has been replaced with a constant region of a human antibody. For increasing the ADCC activity of the human chimeric antibody, for example, the subtype of the human antibody used for the constant region can be IgG1.

A "monoclonal antibody" is an antibody produced by a single clone of B lymphocytes from mouse or rabbit or by a cell, e.g., HEK293 cell, into which the light and heavy chain genes of a single antibody have been transfected. Monoclonal antibodies are produced by methods known to those of ordinary skill in the art, for instance by making hybrid antibody-forming cells from a fusion of myeloma cells with immune spleen cells. These fused cells and their progeny are termed "hybridomas." Monoclonal antibodies include humanized monoclonal antibodies.

The term "human monoclonal antibody" as used herein in the specification and claims refers to a monoclonal antibody that has variable regions in which both the FR and CDR regions are derived from human germline immunoglobulin sequences.

The term "isolated antibody" as used herein the specification and claims refers to an antibody that is substantially free of other antibodies having different antigenic specificities (e.g., an isolated bispecific antibody as described herein that specifically binds the protein of interest). Moreover, an isolated antibody can be substantially free of other cellular material and/or chemicals.

A target amino acid sequence is "derived" from or "corresponds" to a reference amino acid sequence if the target amino acid sequence shares a homology or identity over its entire length with a corresponding part of the reference amino acid sequence of at least 75%, at least 80%, at least 85%, at least 90%, at least 93%, at least 95%, at least 97%, at least 98%, or at least 99%. In any aspect or embodiment described herein, a target amino acid sequence which is "derived" from or "corresponds" to a reference amino acid sequence is 100% homologous, or in particular 100% identical, over its entire length with a corresponding part of the reference amino acid sequence. The "homology" or "identity" of an amino acid sequence or nucleotide sequence is preferably determined according to the present disclosure over the entire length of the reference sequence or over the entire length of the corresponding part of the reference sequence that corresponds to the sequence that homology or identity is defined. An antibody derived from a parent antibody which is defined by one or more amino acid sequences, such as specific CDR sequences or specific variable region sequences, in particular is an antibody having amino acid sequences, such as CDR sequences or variable region sequences, which are at least 75%, at least 80%, at least 85%, at least 90%, at least 93%, at least 95%, at least 97%, at least 98%, or at least 99% homologous or identical, especially identical, to the respective amino acid sequences of the parent antibody. In any aspect or embodiment described herein, the antibody derived from (i.e., derivative of) a parent antibody comprises the same CDR sequences as the parent antibody but differs in the remaining sequences of the variable regions.

By "homology" is meant two or more nucleic acid or amino acid sequences is partially or completely identical. In certain embodiments the homologous nucleic acid or amino acid sequence has 30%, 40%, 50%, 60%, 70%, 80%, 90%, or 95% sequence similarity or identity to a nucleic acid encoding the reference nucleic acid or amino acid sequence.

"Homologs" can be naturally occurring or created by artificial synthesis of one or more nucleic acids or polypeptides having related sequences, or by modification of one or more nucleic acid or amino acid to produce related nucleic acid or amino acid sequences. If the homology between two nucleic acid or amino acid sequences is not expressly described, homology can be inferred by a nucleic acid or amino acid comparison between two or more sequences. If the sequences demonstrate some degree of sequence similarity, for example, greater than about 30% at the primary amino acid structure level, it is concluded that they share a common ancestor. For purposes of the present disclosure, genes are homologous if the nucleic acid or amino acid sequences are sufficiently similar to allow recombination and/or hybridization under low stringency conditions. In addition, polypeptides are regarded as homologous if their nucleic acid sequences are sufficiently similar to allow recombination or hybridization under low stringency conditions.

The term "specific binding" as used in the specification and claims preferably means that an agent such as an antibody, binds stronger to a target, such as an epitope for which it is specific, compared to the binding to another target. An agent binds stronger to a first target compared to a second target if it binds to the first target with a dissociation constant ($K_d$) which is lower than the dissociation constant for the second target. Preferably the dissociation constant for the target to which the agent binds specifically is more than 100-fold, 200-fold, 500-fold or 1000-fold lower than the dissociation constant for the target to which the agent does not bind specifically. Furthermore, the term "specific binding" in particular indicates a binding affinity between the binding partners with an affinity constant $K_a$ of at least $10^6$ $M^{-1}$, preferably at least $10^7$ $M^{-1}$, more preferably at least $10^8$ $M^1$. An antibody specific for a certain antigen in particular refers to an antibody that is capable of binding to said antigen with an affinity having a $K_a$ of at least $10^6$ $M^{-1}$, preferably at least $10^7$ $M^{-1}$, more preferably at least $10^8$ $M^{-1}$.

The present disclosure provides, in any aspect or embodiment described herein, an antibody that binds to a protein of interest, wherein a dissociation rate constant $K_d$ thereof is not less than a first specified value and an association rate constant $K_a$ thereof is not less than a second specified value. The first specified value may be $1\times10^{-4}$ $s^{-1}$ or more, $2\times10^{-4}$ $s^{-1}$ or more, $3\times10^{-4}$ $s^{-1}$ or more, $4\times10^{-4}$ $s^{-1}$ or more, $5\times10^{-4}$ $s^{-1}$ or more, $6\times10^{-4}$ $s^{-1}$ or more, $7\times10^{-4}$ $s^{-1}$ or more, or $8\times10^{-4}$ $s^{-1}$ or more. The second specified value may be $1\times10^{-4}$ $M^{-1}s^{-1}$ or more, $1.5\times10^{-4}$ M-is-1 or more, or $2\times10^{-4}$ $M^{-1}s^{-1}$ or more. $K_D$ of the antibody may be 1 nM to 100 nM, 10 nM to 50 nM, 20 nM to 40 nM, or 30 nM to 40 nM.

Combinations of the first specified value and the second specified value are as follows: the second specified value may be $1\times10^{-4}$ or more and the first specified value may be $1.\text{times}.10^{-4}$ $s^{-1}$ or more; the second specified value may be $1.5\times10^{-4}$ $M^{-1}s^{-1}$ or more and the first specified value may be $2\times10^{-4}$ $s^{-1}$ or more; or the second specified value may be $2\times10^{-4}$ $M^{-1}s^{-1}$ or more and the first specified value may be $3\times10^{-4}$ $s^{-1}$ or more. The upper limit of $K_a$ and $K_d$ may be within the range of $K_a$ and $K_d$ of antibodies obtained as described herein.

The present disclosure provides an antibody that binds to a protein of interest, wherein a dissociation rate constant $K_d$ thereof is $5\times10^{-4}$ $s^{-1}$ or more and an association rate constant $K_a$ thereof is $1\times10^{-4}$ $M^{-1}s^{-1}$ or more. The dissociation rate constant $K_d$ may be, for example, $1\times10^{-4}$ $s^{-1}$ or more, $2\times10^{-4}$ $s^{-1}$ or more, $3\times10^{-4}$ $s^{-1}$ or more, $4\times10^{-4}$ $s^{-1}$ or more, $5\times10^{-4}$ $s^{-1}$ or more, $6\times10^{-4}$ $s^{-1}$ or more, $7\times10^{-4}$ $s^{-1}$ or more, or $8\times10^{-4}$ $s^{-1}$ or more. The association rate constant $K_a$ may be $1\times10^{-4}$ $M^{-1}s^{-1}$ or more, $1.5\times10^{-4}$ $M^{-1}s^{-1}$ or more, or $2\times10^{-4}$ $M^{-1}s^{-1}$ or more. $K_D$ may be 1 nM to 100 nM, 10 nM to 50 nM, 20 nM to 40 nM, or 30 nM to 40 nM. Particularly, combinations of $K_a$ and $K_d$ are as follows: $K_a$ may be $1\times10^{-4}$ $M^{-1}s^{-1}$ or more and $K_d$ may be $1\times10^{-4}$ $s^{-1}$ or more; $K_a$ may be $1.5\times10^{-4}$ $M^{-1}s^{-1}$ or more and $K_a$ may be $2\times10^{-4}$ $s^{-1}$ or more; or $K_a$ may be $2\times10^{-4}$ $M^{-1}$ $s^{-1}$ or more and $K_d$ may be $3\times10^{-4}$ $s^{-1}$ or more. The antibody having the association rate constant and the dissociation rate constant binds to the protein of interest rapidly and also dissociates from the protein of interest rapidly. The upper limit of $K_a$ and $K_d$ may be within the range of $K_a$ and $K_d$ of antibodies obtained by immunizing an animal.

Each of the association rate constant $K_a$ and the dissociation rate constant $K_d$ of an antibody can be determined for example by surface plasmon resonance (SPR) measurement. SPR measurement for binding between an antibody and an antigen is well known and those skilled in the art will be able to calculate the association rate constant $K_a$ and the dissociation rate constant $K_d$ of the antibody based on a well-known technique. In SPR measurement, the association rate constant can be calculated from variation of RU in a phase in which an analyte is flowed at a fixed concentration (association phase) and then, the dissociation constant can be calculated from variation of RU in a phase in which running buffer is flowed (dissociation phase). Measurement can be performed by using single-cycle kinetics. Analysis can be performed by bivalent analysis. Curve fitting of an approximate curve to a measured SPR sensorgram can be performed by using a kinetic titration 1:1 interaction model. For details of curve fitting, one can see Karlsson, R., Katsamba, P. S., Nordin, H., Pol, E. and Myszka, D. G. (2006). "Analyzing a kinetic titration series using affinity biosensors." Anal. Biochem. 349 (1): 136-47. Additionally, assessment of the association rate constant $K_a$ and the dissociation rate constant $K_d$ of an antibody can be performed using surface-based (heterogeneous) methods including SPR, biolayer interferometry (BLI) and enzyme linked immunosorbent assays (ELISA). Schuck 1997; Gauglitz 2008; Friguet et al. 1985.

The association rate constant $K_a$ and the dissociation rate constant $K_d$ of an antibody can also be determined by using an SPR instrument, such as Biacore™ commercially available from GE Healthcare, according to the manufacturer's manual. For example, the SPR measurement instrument also includes a program for determining $K_a$ and $K_d$ and can calculate $K_a$ and $K_d$ from an SPR sensorgram. For example, an SPR sensorgram obtained by a Biacore™ instrument can be subjected to analysis in which Biacore T200 evaluation software is used and a bivalent analyte model is adopted as a fitting model, thereby deriving a fitting curve, from which $K_a$, $K_d$, and KD as kinetics parameters of an antibody or an ADC can be calculated.

In any aspect or embodiment described herein a competitive assay can be used to test whether antibodies have binding properties similar to each other. An antibody that competes with a certain antibody for binding to an antigen thereof can be identified for example by a competitive assay well known to those skilled in the art. When an antibody can block binding of a desired antibody to an antigen thereof, for example, by at least 20%, preferably at least 20 to 50%, further preferably at least 50%, more preferably 60%, more preferably 70%, more preferably 80%, and especially preferably 90% or more, in the competitive assay, the antibody can be identified as an antibody that competes for binding to the same antigen. A competitive antibody can be identified by a cross-blocking assay or a competitive ELISA assay. In the cross-blocking assay, an antigen is coated onto, for example, a microtiter plate, and a competitive antibody entity as a candidate is added thereto and incubated to allow binding between the antigen and the candidate antibody to form. Subsequently, the desired antibody is labelled, then added additionally to the well, incubated, and washed. One can determine whether the candidate antibody competed or not by quantifying the amount of the desired antibody that is bound. When competition exists, the amount of the label remaining in the well should be decreased.

Generally, in the competitive assay, the fact that a first antibody causes dissociation of binding of a second antibody to an antigen does not always mean that the second antibody causes dissociation of binding of the first antibody to the antigen. This can be easily understood by imagining a case where the first antibody shows extremely strong binding to the antigen compared to the second antibody. Identification of an antibody having a similar binding property may be achieved by confirming that the first antibody causes dissociation of binding of the second antibody to an antigen and the second antibody causes dissociation of binding of the first antibody to the antigen. Herein, such a competitive state is referred to as "the first antibody and the second antibody mutually compete with each other for binding to an antigen."

The terms "co-administration" and "co-administering" or "combination therapy" refer to both concurrent administration (administration of two or more therapeutic agents at the same time) and time varied administration (administration of one or more therapeutic agents at a time different from that of the administration of an additional therapeutic agent or agents), as long as the therapeutic agents are present in the patient to some extent, preferably at effective amounts, at the same time. In certain preferred aspects, one or more of the present compounds described herein, are coadministered in combination with at least one additional bioactive agent, especially including an anticancer agent. In particularly preferred aspects, the co-administration of compounds results in synergistic activity and/or therapy, including anticancer activity.

The term "effective amount/dose," "pharmaceutically effective amount/dose," "pharmaceutically effective amount/dose" or "therapeutically effective amount/dose" can mean, but is in no way limited to, that amount/dose of the active pharmaceutical ingredient sufficient to prevent, inhibit the occurrence, ameliorate, delay or treat (alleviate a symptom to some extent, preferably all) the symptoms of a condition, disorder or disease state. The effective amount depends on the type of disease, the composition used, the route of administration, the type of mammal being treated, the physical characteristics of the specific mammal under consideration, concurrent medication, and other factors which those skilled in the medical arts will recognize. Generally, an amount between 0.1 mg/kg and 1000 mg/kg body weight/day of active ingredients is administered dependent upon potency of the agent. Toxicity and therapeutic efficacy of such compounds can be determined by standard pharmaceutical procedures in cell cultures or experimental animals, e.g., for determining the LD50 (the dose lethal to 50% of the population) and the ED50 (the dose therapeutically effective in 50% of the population). The dose ratio between toxic and therapeutic effects is the therapeutic index and it can be expressed as the ratio LD50/ED50. Compounds that exhibit large therapeutic indices are preferred. While compounds that exhibit toxic side effects may be used, care should be taken to design a delivery system that targets such compounds to the site of affected tissue in order to minimize potential damage to uninfected cells and, thereby, reduce side effects. The data obtained from the cell culture assays and animal studies can be used in formulating a range of dosage for use in humans. The dosage of such compounds lies preferably within a range of circulating concentrations that include the ED50 with little or no toxicity. The dosage may vary within this range depending upon the dosage form employed and the route of administration utilized. For any compound used in the method of the present disclosure, the therapeutically effective dose can be estimated initially from cell culture assays. A dose may be formulated in animal models to achieve a circulating plasma concentration range that includes the IC50 (i.e., the concentration of the test compound which achieves a half-maximal inhibition of symptoms) as determined in cell culture. Such information can be used to more accurately determine useful doses in humans. Levels in plasma may be measured, for example, by high performance liquid chromatography.

The term "pharmacological composition," "therapeutic composition," "therapeutic formulation" or "pharmaceutically acceptable formulation" can mean, but is in no way limited to, a composition or formulation that allows for the effective distribution of an agent provided by the present disclosure, which is in a form suitable for administration to the physical location most suitable for their desired activity, e.g., systemic administration.

The term "pharmaceutically acceptable" or "pharmacologically acceptable" can mean, but is in no way limited to, entities and compositions that do not produce an adverse, allergic or other untoward reaction when administered to an animal, or a human, as appropriate.

The term "pharmaceutically acceptable carrier" or "pharmacologically acceptable carrier" can mean, but is in no way limited to, any and all solvents, dispersion media, coatings, antibacterial and antifungal agents, isotonic and absorption delaying agents, and the like, compatible with pharmaceutical administration. Suitable carriers are described in the most recent edition of Remington's Pharmaceutical Sciences, a standard reference text in the field, which is incorporated herein by reference. Preferred examples of such carriers or diluents include, but are not limited to, water, saline, finger's solutions, dextrose solution, and 5% human serum albumin. Liposomes and non-aqueous vehicles such as fixed oils may also be used. The use of such media and agents for pharmaceutically active substances is well known in the art. Except insofar as any conventional media or agent is incompatible with the active compound, use thereof in the compositions is contemplated. Supplementary active compounds can also be incorporated into the compositions.

The term "systemic administration" refers to a route of administration that is, e.g., enteral or parenteral, and results in the systemic distribution of an agent leading to systemic absorption or accumulation of drugs in the blood stream followed by distribution throughout the entire body. Suitable forms, in part, depend upon the use or the route of entry, for example oral, transdermal, or by injection. Such forms should not prevent the composition or formulation from reaching a target cell (i.e., a cell to which the negatively charged polymer is desired to be delivered to). For example, pharmacological compositions injected into the blood stream should be soluble. Other factors are known in the art, and include considerations such as toxicity and forms which prevent the composition or formulation from exerting its effect. Administration routes which lead to systemic absorption include, without limitations: intravenous, subcutaneous, intraperitoneal, inhalation, oral, intrapulmonary and intramuscular. The rate of entry of a drug into the circulation has been shown to be a function of molecular weight or size. The use of a liposome or other drug carrier comprising the compounds of the present disclosure can potentially localize the drug, for example, in certain tissue types, such as the tissues of the reticular endothelial system (RES). A liposome formulation which can facilitate the association of drug with the surface of cells, such as, lymphocytes and macrophages is also useful.

The term "conservative substitution" or "conservative mutation" as used herein in the specification and claims refers to replacement of an amino acid by an amino acid of similar structure (such as size) and characteristics or chemical nature, such as where a hydrophobic amino acid is replaced by another hydrophobic amino acid (e.g., replacing a leucine with an isoleucine). In studies of sequence variations in families of naturally occurring homologous proteins, certain amino acid substitutions are more often tolerated than others, and these are often show correlation with similarities in size, charge, polarity, and hydrophobicity between the original amino acid and its replacement, and such is the basis for defining "conservative substitution" or "conservative mutation". In any aspect or embodiment described herein the term "conservative mutations" or "conservative substitutions" can refer to the substitution, deletion or addition of nucleic acids that alter, add or delete a single amino acid or a small number of amino acids in a coding sequence where the nucleic acid alterations result in the substitution of a chemically similar amino acid. Amino acids that may serve as conservative substitutions for each other include the following: Basic: Arginine (R), Lysine (K), Histidine (H); Acidic: Aspartic acid (D), Glutamic acid (E), Asparagine (N), Glutamine (Q); hydrophilic: Glycine (G), Alanine (A), Valine (V), Leucine (L), Isoleucine (I); Hydrophobic: Phenylalanine (F), Tyrosine (Y), Tryptophan (W); Sulfur-containing: Methionine (M), Cysteine (C). In addition, sequences that differ by conservative variations are generally homologous.

The term "patient" or "subject" is used throughout the specification to describe an animal, preferably a human or a domesticated animal, to whom treatment, including prophylactic treatment, with the compositions according to the present disclosure is provided. For treatment of those infections, conditions or disease states which are specific for a specific animal such as a human patient, the term patient refers to that specific animal, including a domesticated animal such as a dog or cat or a farm animal such as a horse, cow, sheep, etc. In general, in the present disclosure, the term patient refers to a human patient unless otherwise stated or implied from the context of the use of the term.

The term "therapeutically effective amount or dose" includes a dose of a drug that is capable of achieving a therapeutic effect in a subject in need thereof. For example, a therapeutically effective amount of a drug can be the amount that is capable of preventing or relieving one or more symptoms associated with a disease or disorder, e.g., tissue injury or muscle-related disease or disorder. The exact amount can be ascertainable by one skilled in the art using known techniques (see, e.g., Lieberman, Pharmaceutical Dosage Forms (vols. 1-3, 1992); Lloyd, The Art, Science and Technology of Pharmaceutical Compounding (1999); Pickar, Dosage Calculations (1999); and Remington: The Science and Practice of Pharmacy, 20th Edition, 2003, Gennaro, Ed., Lippincott, Williams & Wilkins).

A kit is any manufacture (e.g., a package or container) comprising at least one reagent, e.g., a probe, for specifically detecting a marker of the present disclosure. The manufacture may be promoted, distributed, or sold as a unit for performing the methods of the present disclosure. The reagents included in such a kit comprise antibodies for use in treating a disease and/or disorder and/or detecting/binding the protein of interest. In addition, the kits of the present disclosure may preferably contain instructions which describe the therapeutic use of the antibodies and/or a suitable detection assay utilizing the antibodies. Such kits can be conveniently used, e.g., in clinical settings, to diagnose or treating patients exhibiting symptoms of a disease and/or disorder.

SPECIFIC EMBODIMENTS

An aspect of the present disclosure relates to an in vivo immunization method comprising: (a) immunizing an animal at least once with a modified peptide having an amino acid sequence of about 10 to about 20 amino acids identical to an amino acid sequence of a protein of interest except wherein one internal amino acid has been substituted with a non-native amino acid (nnAA); and (b) boosting the animal at least once with a first unmodified peptide comprising a core amino acid sequence identical to the modified peptide of step (a), except wherein the nnAA has been substituted with the native amino acid (nAA), a first N-terminal amino acid sequence that is not native to the protein of interest, and a first C-terminal amino acid sequence that is not native to the protein of interest.

In any aspect or embodiment described herein, the method further comprises: (c) cloning B-cells obtained from the animal; and (d) identifying a clone of step (c) that: (i) binds to the first unmodified peptide and a second unmodified peptide comprising a core amino acid sequence that is identical to the first unmodified peptide, a second N-terminal amino acid sequence that is not native to the protein of interest, and a second C-terminal amino acid sequence that is not native to the protein of interest; and (ii) does not bind to the modified peptide of step (a).

In any aspect or embodiment described herein, the method further comprises identifying a close that binds to the protein of interest.

In any aspect or embodiment described herein, the method further comprises: (c).cloning B-cells obtained from the animal; and (d) identifying a clone of step (c) that bind to the protein of interest in its native conformation.

A further aspect of the present disclosure relates to an in vivo immunization method comprising immunizing an animal at least once with: (a) a first antigenic fusion peptide comprising a first antigenic peptide (M1) having an amino acid sequence of about 10 to about 20 amino acids identical to a first amino acid sequence (N1) of a protein of interest except wherein one internal amino acid has been substituted with a non-native amino acid (nnAA); and a second antigenic peptide (M2) having an amino acid sequence of about 10 to about 20 amino acids identical to a second amino acid sequence (N2) of a protein of interest, wherein the first peptide and the second peptide are joined by a linker (A); and (b) boosting the animal at least once with a second antigenic fusion peptide comprising N1 joined to N2 by a linker (C), wherein the second antigenic fusion peptide further comprises a first N-terminal amino acid sequence (NT1) that is not native to the protein of interest and a first C-terminal amino acid sequence (CT1) that is not native to the protein of interest.

An additional aspect of the present disclosure relates to an in vivo immunization method comprising immunizing an animal at least once with: (a) a first antigenic fusion peptide comprising a first antigenic peptide (M1) having an amino acid sequence of about 10 to about 20 amino acids identical to a first amino acid sequence (N1) of a protein of interest except wherein one internal amino acid has been substituted with a non-native amino acid (nnAA); and a second antigenic peptide (M2) having an amino acid sequence of about 10 to about 20 amino acids identical to a second amino acid sequence (N2) of a protein of interest except wherein one internal amino acid has been substituted with a non-native amino acid (nnAA), wherein the first antigenic peptide and the second antigenic peptide are joined by a linker (B); and (b) boosting the animal at least once with a second antigenic fusion peptide comprising N1 joined to N2 by a linker (C), wherein the second antigenic fusion peptide further comprises a first N-terminal amino acid sequence (NT1) that is not native to the protein of interest and a first C-terminal amino acid sequence (CT1) that is not native to the protein of interest.

In any aspect or embodiment described herein, the method further comprises prior to step (b) immunizing the animal receiving the antigen of step (a)(i) at least once with a third antigenic fusion peptide comprising N1 joined to M2 by a linker (D).

In any aspect or embodiment described herein, the method further comprises: (c) cloning B-cells obtained from the animal; and (d) identifying a clone of step (c) that: (i) binds to a peptide comprising N1 joined to N2 by a linker (C), wherein the peptide further comprises a second N-terminal amino acid sequence (NT2) that is not native to the protein of interest and a second C-terminal amino acid sequence (CT2) that is not native to the protein of interest; and (ii) does not bind to the first antigenic fusion peptide or the second antigenic fusion peptide.

In any aspect or embodiment described herein, the method further comprises identifying a clone that bind to the protein of interest.

In any aspect or embodiment described herein, the first amino acid sequence of the protein of interest and the second amino acid sequence of the protein of interest are from the same protein (i.e., the protein of interest of the first amino acid sequence and the protein of interest of the second amino acid sequence are the same protein).

In any aspect or embodiment described herein, the first amino acid sequence of the protein of interest and the second amino acid sequence of the protein of interest are from different proteins (i.e., the protein of interest of the first amino acid sequence and the protein of interest of the second amino acid sequence are different proteins).

In any aspect or embodiment described herein, the animal is a human, a rabbit, a mouse, a rat, a goat, a cow, a pig, a camelid, or a chicken.

In any aspect or embodiment described herein, the animal is a non-human animal that has a human or humanized immune system.

In any aspect or embodiment described herein, the peptide is administered with an adjuvant.

In any aspect or embodiment described herein, the adjuvant is Complete Freund's Adjuvant (CFA), Incomplete Freund's Adjuvant (IFA), aluminum, monophosphoryl lipid A (MPL) and aluminum salt (ASO4), oil-in-water emulsion, oil-in-water emulsion of squalene (MF59), ASO3 (Vitamin E, Surfactant polysorbate 80, and squalene), MPL and QS-21 in a liposome formulation (AS01), or cytosine phosphoguanine (CpG).

In any aspect or embodiment described herein,

In any aspect or embodiment described herein, the modified peptide and/or the first unmodified peptide is conjugated to one or more carriers.

In any aspect or embodiment described herein, the first antigenic fusion peptide is conjugated to one or more carriers.

In any aspect or embodiment described herein, the carrier is keyhole limpet hemocyanin (KLH) or ovalbumin.

Another aspect of the present disclosure relates to a method of producing a site directed binding agent to a protein of interest, the method comprising: (a) providing a modified peptide having an amino acid sequence of about 10 to about 20 amino acids identical to an amino acid sequence of a protein of interest except wherein one internal amino acid has been substituted with a non-native amino acid (nnAA); (b) screening the modified peptide against a library; (c) isolating one or more binding agents that bind to the modified peptide; (d) generating a library of clonotypes of the one or more binding agents isolated in step (c); (e) screening the library of clonotypes against: (i) the modified peptide of step (a); and (ii) a first unmodified peptide comprising a core amino acid sequence identical to the modified peptide of step (a), except wherein the nnAA has been substituted with the native amino acid (nAA), a first N-terminal amino acid sequence that is not native to the protein of interest, and a first C-terminal amino acid sequence that is not native to the protein of interest; and (f) isolating a binding agent that bind to both the first unmodified peptide and the modified peptide.

In any aspect or embodiment described herein, the method further comprising: (g) generating a library of clonotypes of the binding agent isolated in step (f); (h) screening the library of clonotypes of step (g) against: (i) the modified peptide; (ii) the first unmodified peptide; and (iii) a second unmodified peptide comprising a core amino acid sequence that is identical to the first unmodified peptide, a second N-terminal amino acid sequence that is not native to the protein of interest, and a second C-terminal amino acid sequence that is not native to the protein of interest; and (i) isolating a binding agent that binds to the first unmodified peptide and the second unmodified peptide, wherein the binding agent does not bind to the modified peptide.

A further aspect of the present disclosure relates to a method of producing a site directed conformational binding agent to a protein of interest, the method comprising: (a) providing a first antigenic fusion peptide comprising a first antigenic peptide (M1) having an amino acid sequence of about 10 to about 20 amino acids identical to a first amino acid sequence (N1) of a protein of interest except wherein one internal amino acid has been substituted with a non-native amino acid (nnAA); and a second antigenic peptide (M2) having an amino acid sequence of about 10 to about 20 amino acids identical to a second amino acid sequence (N2) of a protein of interest, wherein the first antigenic peptide and the second antigenic peptide are joined by a linker (A); (b) screening M1 against a library; (c) isolating one or more binding agents that bind to M1; (d) generating a library of clonotypes of the one or more binding agents isolated in step (c); (e) screening the library of clonotypes against: (i) M1; and (ii) a first peptide comprising N1 joined to N2 by a linker (B), wherein the first peptides further comprises a first N-terminal amino acid sequence (NT1) that is not native to the protein of interest and a first C-terminal amino acid sequence (CT1) that is not native to the protein of interest; and (f) isolating a binding agent that bind to M1 and the first peptide.

In any aspect or embodiment described herein, the method further comprises: (g) generating a library of clonotypes of the binding agents isolated in step (f); (h) screening the library of clonotypes of step (g) against: (i) M1; (ii) the first peptide; and (iii) a second peptide comprising N1 joined to N2 by a linker (D), wherein the second peptide further comprises a second N-terminal amino acid sequence (NT2) that is not native to the protein of interest and a second C-terminal amino acid sequence (CT2) that is not native to the protein of interest; (i) isolating a binding agent that bind to: (i) M1, the first peptide, and the second peptide; or (ii) the first peptide and the second peptide.

In any aspect or embodiment described herein, the display library is an antibody display library, and the binding agent is an antibody or an antigen binding fragment thereof.

In any aspect or embodiment described herein, the display library is an aptamer display library and the binding agent is an aptamer.

In any aspect or embodiment described herein, the nnAA is a non-synonymous amino acid.

In any aspect or embodiment described herein, the nnAA is phosphorylated, acetylated, isocyanated, sulfated, or nitrated.

In any aspect or embodiment described herein, the nnAA is O-phosphoserine (SEP).

In any aspect or embodiment described herein, the nnAA is phosphotyrosine.

In any aspect or embodiment described herein, the nnAA is phosphothreonine.

In any aspect or embodiment described herein, the N-terminal amino acid sequence is SerGlySer, GlySerGly, GlyGlyGly, or SerSerSer.

In any aspect or embodiment described herein, the C-terminal amino acid sequence is SerGlySer, GlySerGly, GlyGlyGly, or SerSerSer.

Another aspect of the present disclosure relates to a kit comprising (a) a first compartment comprising a modified peptide having an amino acid sequence of about 10 to about 20 amino acids identical to an amino acid sequence of a protein of interest except wherein one internal amino acid has been substituted with a non-native amino acid (nnAA); (b) a second compartment comprising a first unmodified peptide having a core amino acid sequence identical to the modified peptide of step (a), except wherein the nnAA has been substituted with the native amino acid (nAA) and comprising a first N-terminal amino acid sequence and a first C-terminal amino acid sequence that is not native to the protein of interest; (c) a third compartment comprising a second unmodified peptide having a core amino acid sequence that is identical to the first unmodified peptide and comprising a second N-terminal amino acid sequence that is not native to the protein of interest and a second C-terminal amino acid sequence that is not native to the protein of interest; and (d) instructions for use.

In any aspect or embodiment described herein, the kit further comprising a fourth compartment comprising an adjuvant.

In any aspect or embodiment described herein, the modified peptide is conjugated to one or more carriers, the first unmodified peptide is conjugated to one or more carriers, and/or the second unmodified peptide is conjugated to one or more carriers.

In any aspect or embodiment described herein, the carrier is keyhole limpet hemocyanin (KLH) or ovalbumin.

An additional aspect of the present disclosure relates to a kit comprising: (a) a first container comprising a first antigenic fusion peptide comprising a first antigenic peptide (M1) having an amino acid sequence of about 10 to about 20 amino acids identical to a first amino acid sequence (N1) of a protein of interest except wherein one internal amino acid has been substituted with a non-native amino acid (nnAA); and a second antigenic peptide (M2) having an amino acid sequence of about 10 to about 20 amino acids identical to a second amino acid sequence (N2) of a protein of interest except wherein one internal amino acid has been substituted with a non-native amino acid (nnAA), wherein M1 and M2 are joined by a linker (A); (b) a second compartment comprising a second antigenic fusion peptide comprising N1 joined to N2 by a linker (B), and wherein the second antigenic fusion peptide further comprises a first N-terminal amino acid sequence (NT1) that is not native to the protein of interest and a second C-terminal amino acid sequence (CT1) that is not native to the protein of interest; (c) a third compartment comprising a third antigenic fusion peptide comprising N1 joined to N2 by a linker (C) peptide, wherein the third antigenic fusion peptide further comprises a second N-terminal amino acid sequence (NT2) that is not native to the protein of interest and a second C-terminal amino acid sequence (CT2) that is not native to the protein of interest; and (d) instructions for use.

In any aspect or embodiment described herein, the kit further comprises a fourth compartment comprising a fourth antigenic fusion peptide comprising M1 joined by a linker (D) to N2.

In any aspect or embodiment described herein, the kit further comprises a fifth compartment comprising a fifth antigenic peptide comprising N1 joined by a linker (E) to M2.

In any aspect or embodiment described herein, the kit further comprises a sixth compartment comprising an adjuvant.

Other Embodiments

The preceding detailed description of the present disclosure is provided to aid those skilled in the art in practicing the present disclosure. Those of ordinary skill in the art may make modifications and variations in the embodiments described herein without departing from the spirit or scope of the present disclosure. Although any methods and materials similar or equivalent to those described herein can also be used in the practice or testing of the present disclosure, the preferred methods and materials are now described. Unless otherwise defined, all technical and scientific terms used herein have the same meaning as commonly understood by one of ordinary skill in the art to which this disclosure belongs. The terminology used in the description of the present disclosure herein is for describing particular embodiments only and is not intended to be limiting of the present disclosure. All publications, patent applications, patents, figures and other references mentioned herein are expressly incorporated by reference in their entirety.

EXAMPLES

Example 1: Immunogen Design Used to Generate Site-Specificity

As one example of immunogen design, three peptides are synthesized. A first peptide is modified with a non-native amino acid (nnAA) or residue in the middle of a 16-20 mer peptide, where the non-native amino acid or residue is placed at the site-specific target site. This is the modified peptide (peptide "1"). See FIG. 1. A non-native amino acid or residue is chosen that acts as a hapten. For example, in an aspect or embodiment described herein, phosphate may be utilized as the hapten of the non-native amino acid or residue, such as phosphotyrosine, O-phosphoserine (SEP), and phosphothreonine. SEP can easily be incorporated into peptides and an engineered SEP-incorporating suppressing strain of E. coli is available to incorporate SEP into specific protein sites. Similar E. coli strains exist for phosphotyrosine but require a post-synthesis treatment Other charged modifications (e.g., acetylate, isocyanate, sulfate and nitrate) can be utilized for the non-native amino acid or residue.

The non-native amino acid or residue initiates an immune response to the hapten within the context of the adjacent amino acid sequence. The non-native amino acid containing peptide (peptide "1" or the "first peptide") is used for the initial/first immunization to select for a B cell response against the non-native amino acid within the context sequence. This also serves to overcome self-tolerance, since the non-native amino acid, although immunogenic, is not native to the site being targeted. An unmodified second peptide (peptide "2") is used to enrich for those affinity-matured B cells that either: (1) recognize specifically another moiety (ideally the native amino acid) at the non-native amino acid or residue site (epitope spread) or (2) have increased binding specificity to the context sequence to compensate for loss of specificity at the non-native amino acid or residue site (epitope degeneracy). See FIG. 1. The amino termini and carboxyl termini are different between all three peptides to be able to differentiate between monoclonal antibodies that bind the central amino acid sequence encoding the target site from monoclonal antibodies that bind to a terminus of the second peptide (or peptide "2") or the third peptide (or peptide "3").

Example 2: Immunization Protocol

The animal is first immunized 1, 2, or 3 times with non-native amino acid or residue containing peptide (i.e., the first peptide or peptide "1"), then boosted 1, 2, or 3 times with the second peptide or peptide "2" and finally with native, folded protein, if available. Peripheral blood mononuclear cells (PBMCs) are isolated from the blood. Monoclonal antibodies cloned from individual B cells are tested in ELISA against the first peptide (peptide "1"), the second peptide (peptide "2"), and the third peptide (peptide "3"). If available, the monoclonal antibodies can be examined for binding to the native protein. Optionally, controls with unmodified native peptide(s) may be run at the same time.

Example 3: Antibody Specificity Analysis

Monoclonal antibodies from isolated B cells that do not bind to an appropriate set of negative controls (e.g., a scrambled peptide sequence and/or any carrier protein(s) used in the immunizations) and bind specifically to the first peptide, the second peptide, and the third peptide bind the common amino acid central core of the first peptide, the second peptide, and the third peptide. Additionally, because these monoclonal antibodies bind both the non-native amino acid modified peptide (i.e., the first peptide) and unmodified peptides (i.e., the second peptide and the third peptide), the monoclonal antibody binds independently of the non-native amino acid present in the first peptide ("non-native amino acid independent binding monoclonal antibody") and the unique amino termini and carboxyl termini of the three peptides. Monoclonal antibodies that bind to both unmodified peptides (i.e., the second peptide and the third peptide) and not to the non-native amino acid modified peptide (i.e., the first peptide) bind the central core but are specific for the native amino acid sequence (i.e., the native sequence specific binding monoclonal antibody). Monoclonal antibodies that bind to only one of the three peptides (i.e., the first peptide, the second peptide, and the third peptide) are not analyzed further. A monoclonal antibody that only binds the non-native amino acid modified peptide or the first peptide has a binding specificity for the non-native amino acid of the peptide, while a monoclonal antibody that only binds one of the two unmodified peptides (i.e., the second peptide or the third peptide) has a binding specificity for the unique amino acid sequence of the N-terminus or the C-terminus of the peptide it binds. Using the non-native amino acid modified peptide (i.e., the first peptide) as the first immunogen overcomes tolerance, thereby allowing an immune response to be generated that may not be demonstrated the subject if the second peptide were the first immunogen.

Example 4: Conformational Specificity of Epivolve Antibodies

Using phage display, site-directed monoclonal antibodies were made that are conformational dependent (IgG11 or demonstrated to bind to folded full-length protein). In vivo work not included herein indicates that monoclonal antibodies that recognize conformational epitopes can be generated in animals: monoclonal antibodies that are immunized first with modified peptide "1" (the first peptide), then subsequently unmodified peptide "2" (the second peptide). Monoclonal antibodies from these animals were demonstrated to bind to folded full-length protein in in vitro ELISAs always bind to either: (i) the first peptide, the second peptide, the third peptide, and the folded full-length protein, or (ii) the second peptide, the third peptide, and the folded full-length protein. The inventors have not found B cells that produce monoclonal antibodies that bind solely to the folded full-length protein when the animals are not immunized with the folded full-length protein. When folded full-length protein is used as the final immunogen (i.e., animals immunized with modified peptide, then by unmodified peptide, and lastly with folded protein), monoclonal antibodies that bind solely to folded protein are generated (i.e., the monoclonal antibodies do not bind to the first peptide or the second peptide used to immunize the animals). Either (1) the monoclonal antibodies from animals immunized with a final boost of folded protein were generated initio against and bind to an epitope that is not overlapping with the non-native amino acid or residue site, or (2) the monoclonal antibodies produced by clonal B cells in the animals immunized with a final boost of folded protein were selected for and enriched by an immunodominant anti-peptide "1" (modified or the first peptide) or peptide "2" (unmodified or the second peptide) in the response, but are conformational-specific through further affinity maturation against the folded protein used in the final immunization, but do not retain binding affinity to the first peptide or the second peptide under the conditions tested.

Figure 2A:
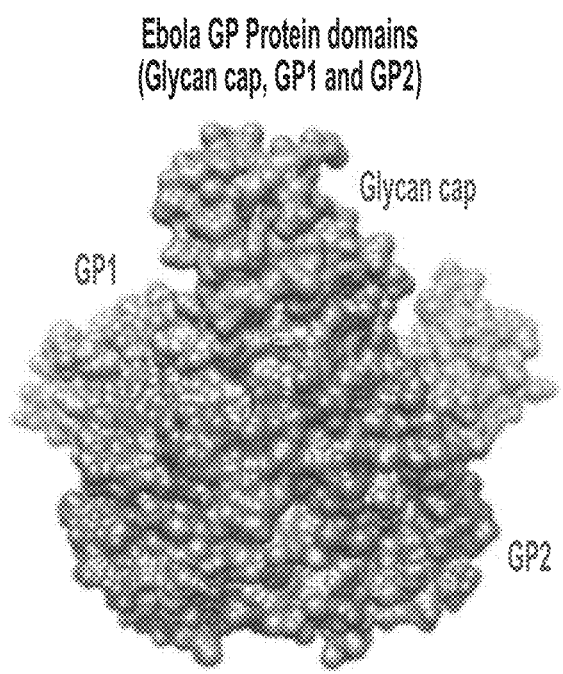
Figure 2B:
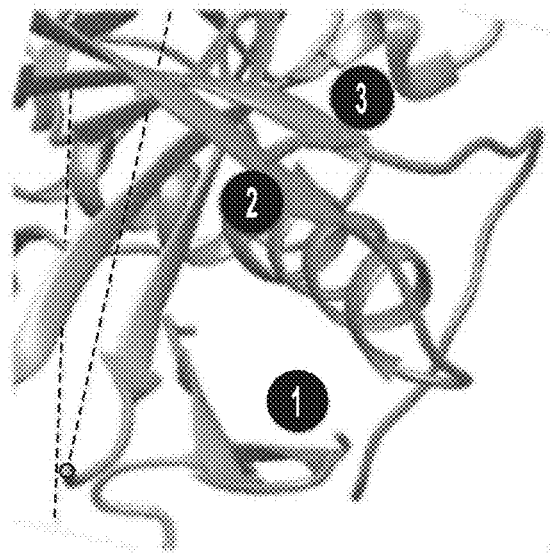
Figure 2C:
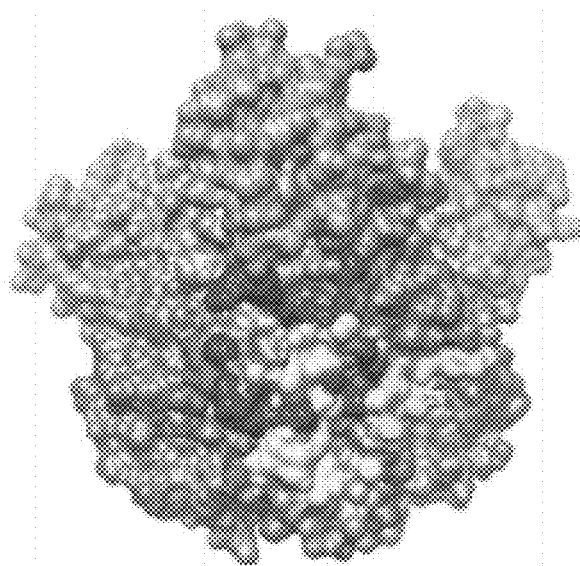
Figure 4:
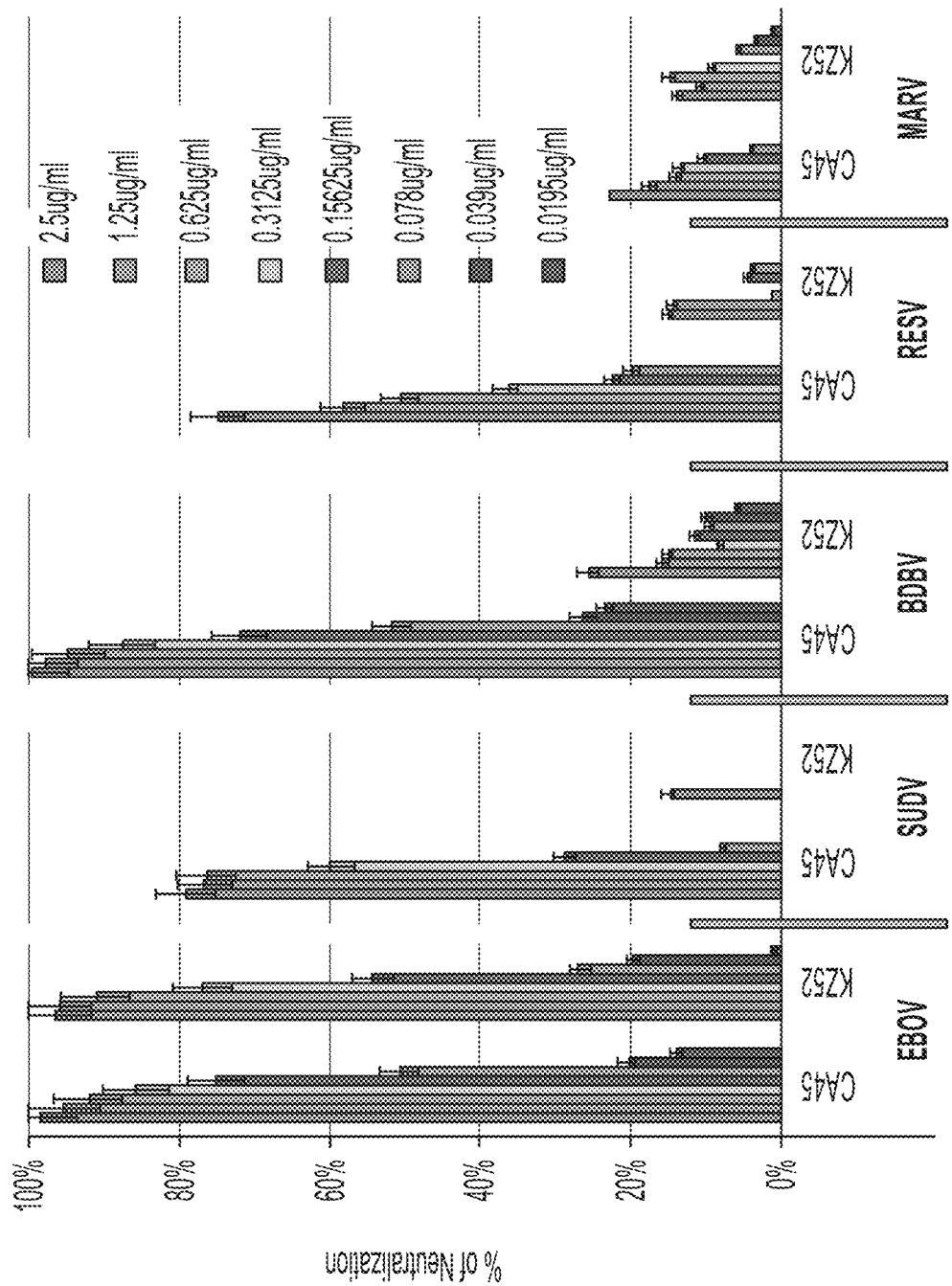
FIG. 4 is a series of bar charts showing the neutralization of monoclonal antibodies CA45 and KZ52 a panel of pseudoparticles. Four subtypes of Ebola virus pseudoparticles (Zaire (EBOV), Sudan, Bundibugyo (BDBV) and Reston) and Marburg virus (MARV) pseudoparticle were examined. Ebola antibodies CA45 and KZ52 were used for the neutralization analysis at concentrations from 2.5 µg/ml to 19.5 ng/ml. PBS (not shown) and HCV E2 monoclonal antibody HC84.26 were used for negative controls.

Example 5: Expression and Purification of Wild Type (Wt) Control Glycoprotein (GP) and Alanine Scanning GP Protein Mutants Using a Filovirus Glycoprotein We use two benchmark control mAb with structurally well-characterized binding sites on the filovirus glycoprotein (GP) that are of primary interest for this project, the macaque mAb CA45[26-27a] and human survivor mAb KZ52[28-30] (FIGS. 2A-2D). Both have been characterized as mapping to a similar discontinuous epitope of GP with subsites 1, 2 and 3 (FIGS. 2B and 2D). The sites map across a furin cleavage site on the GP that when cleaved, forms GP1 and GP2. The cleavage event is needed for viral entry. Several other neutralizing mAb that bind at nearly the same site as KZ52 and CA45 and also prevent cleavage are known (FIG. 2C). So, we know a priori that discontinuous binding to the independent subsites can exist giving us some indication that we will be able to find something similar. The discontinuous epitopes, at least for CA45 and KZ52, are neutralizing against a wide number of filoviruses (FIG. 4). A wildtype GP control and several independent mutants of the GP is constructed. For structural alanine scanning, at least three separate GPs are made with an alanine amino acid at the non-native amino acid or residue targeted sites ASN40ALA, ASN512ALA and GLN542ALA (FIGS. 2B and 3D, sites labeled 1, 2, and 3). Using Epivolve we provide target-site independent clones (e.g., monoclonal antibodies that bind regardless of what residue is at the target site: ASN, SEP or ALA). As such, constructs are made that encode additional alanine substitutions of amino acids adjacent to the 3 targeted sites. For protein production of 6xHis-tagged GP constructs, expression systems implemented at the University of MD for production of these proteins will be utilized: transient transfection of HEK293 Freestyle suspension cells and baculovirus based insect cell expression PNGaseF can be used for the deglycosylation, where utilized, of the GPs Purified GP will be assessed for structural homogeneity by thermal melting curve and SEC chromatography. Monoclonal IgG production will be undertaken as previously known in the art.

Immunization

The Epivolve method is demonstrated using several Ebola target sites on the GP. Serial immunization injections will be spaced at least 2 weeks apart. Depending on the serum response against a given antigen, with up to three separate sequential immunizations of the same antigen before moving on to the next antigen in each series. The peptides are conjugated to either KLH or ovalbumin. The controls for the conjugated proteins are included as a variable in the experiments. Complete Freund's Adjuvant (CFA) are used in the first dose, then incomplete Freund's adjuvant (IFA) for the subsequent doses. Controls, consisting of native peptides and modified peptides as the sole immunogen are performed. Two target sites are focused on, the one on GP1 (site 1 in FIG. 2D) and site 2 of the two sites on GP2 (site 2 in FIG. 2D). Description of six of the experimentally-relevant immunization series (the "I-set(6)") for producing discontinuous epitopes is as follows [note that site "1" and site "2" refer to the discontinuous sub-sites on each of the monoclonal antibodies CA45 and KZ52 discontinuous binding site as determined by structural and mutagenesis information]:

Series 1—site 1 modified peptide followed by site 1 native peptide;
Series 2—site 2 modified peptide followed by site 2 native peptide;
Series 3—folded GP only;
Series 4—site 1 modified peptide and site 2 modified peptide immunization performed at the same time, followed by site 1 native peptide and site 2 native peptide at the same time;
Series 5—site 1 modified peptide, followed by site 2 modified peptide, followed by site 1 native peptide, followed by site 2 native peptide; and
Series 6—Series 5 followed by folded GP.

B Cell and IgG Cloning

Briefly, peripheral blood mononuclear cells (PBMCs) from blood and spleens obtained on day 7 post final immunization/boost are arrayed in groups of around 100 along with cell culture medium into wells of 384 well plates and incubated for 7-10 days. ELISAs are then performed against peptides and GP proteins using supernatants from the 384-wells. Direct IgG cloning from wells expressing IgGs with expected ELISA results is performed by reverse transcriptase polymerase chain reaction (RT-PCR) of the IgG heavy and light chains, cloned into IgG expression plasmids and transiently transfected into CHO or HEK cells. The primer sequences of the heavy and light IgG chains for direct cloning from individual B cells has been published for mice and rabbits. Direct cloning from B cells provides the advantage of the cloned monoclonal antibodies being expressed directly in mammalian cells as IgGs.

Fine-Specificity Mapping and Affinity Measurements of Epivolve-Directed Monoclonal Antibody Responses Monoclonal antibodies that only bind to the native structure are considered conformational. Conformational-specific monoclonal antibody binding are validated using the alanine scanning set of folded protein to determine if they are discontinuous.

Testing Monoclonal Antibodies and Defining the Linear or Conformational Nature of Epitopes Monoclonal antibodies that bind in ELISA to only peptides and denatured GP are considered to target linear epitopes. Monoclonal antibodies that bind both the native and denatured GP are considered to target either linear or confirmation-independent. As the focus is on conformation-dependent monoclonal antibodies, the monoclonal antibodies that are not the linear and confirmation-independent monoclonal antibodies are expressed and purified from transiently transfected HEK freestyle cells for further examination. Purified IgGs are assayed by ELISA for binding to wildtype GP and the structural ala scanning GP constructs. The ala scanning of surface exposed residues approach has been successful in mapping both conformation and linear epitopes of other filovirus monoclonal antibodies [33]. The monoclonal antibodies CA45 and KZ52 are used as benchmark controls for all studies.

Characterization of Affinity Measurements

The equilibrium dissociation constant of purified monoclonal antibodies derived from the Series 6 are examined using wildtype GP protein as the antigen. The equilibrium dissociation constants ($K_D$s) of isolated monoclonal antibodies against purified GP protein are measured by surface plasmon resonance (SPR) via Biacore™ [44], Octet Red, and/or titration ELISA.

Biochemical and Functional Characterization of Conformation-Specific Monoclonal Antibodies.

During infection, the GP is normally cleaved by furin into two subunits, GP1 and GP2 See FIG. 3. This cleavage is blocked by the monoclonal antibodies CA45 and KZ52 [27]. Inhibiting cleaving prevents viral entry into VsV pseudoparticles and virus during natural infections.

Inhibition of Cleavage Assay

The binding of conformation-specific monoclonal antibodies derived from Series 6 will be tested for blocking the cleavage of the GP by furin protease into GP1-GP2 subunits. The assay method is performed as previously described. Furin is purchased from a commercial source [Abcam, Cambridge, MA]. The benchmark monoclonal antibodies CA45 and KZ52 are used as positive controls.

Neutralization Assays.

Purified monoclonal IgGs will be examined for their ability to block cleavage. These purified monoclonal antibodies are tested against a panel of filoviridae using a vesicular stomatitis virus (VSV)-based pseudotyped viral neutralization assay as previously described in the art. The sensitivity, specificity, and correlation of VSV-based pseudotyped virus with live EBOV neutralization has been previously described in the art.

Results

Figure 5:
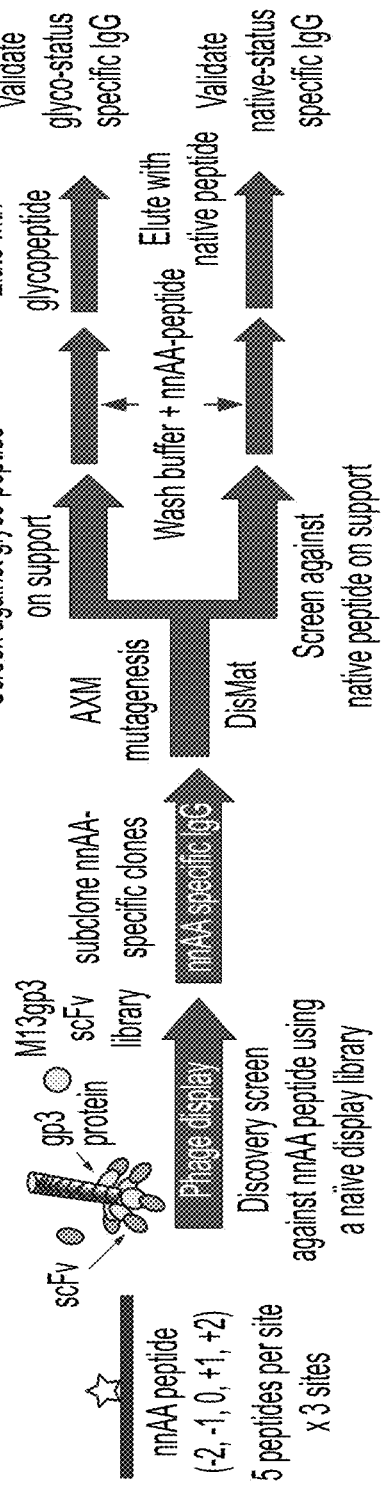
FIG. 5 are schematics of detailing the uses the Epivolve method to produce antibodies that differentiate glycosylation status.
Figure 5:
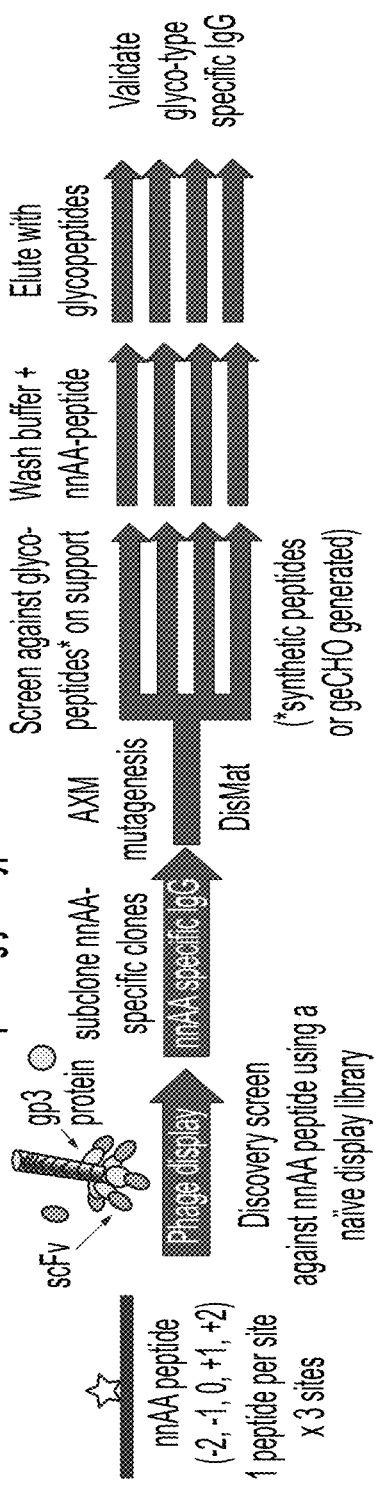
Figure 6A:
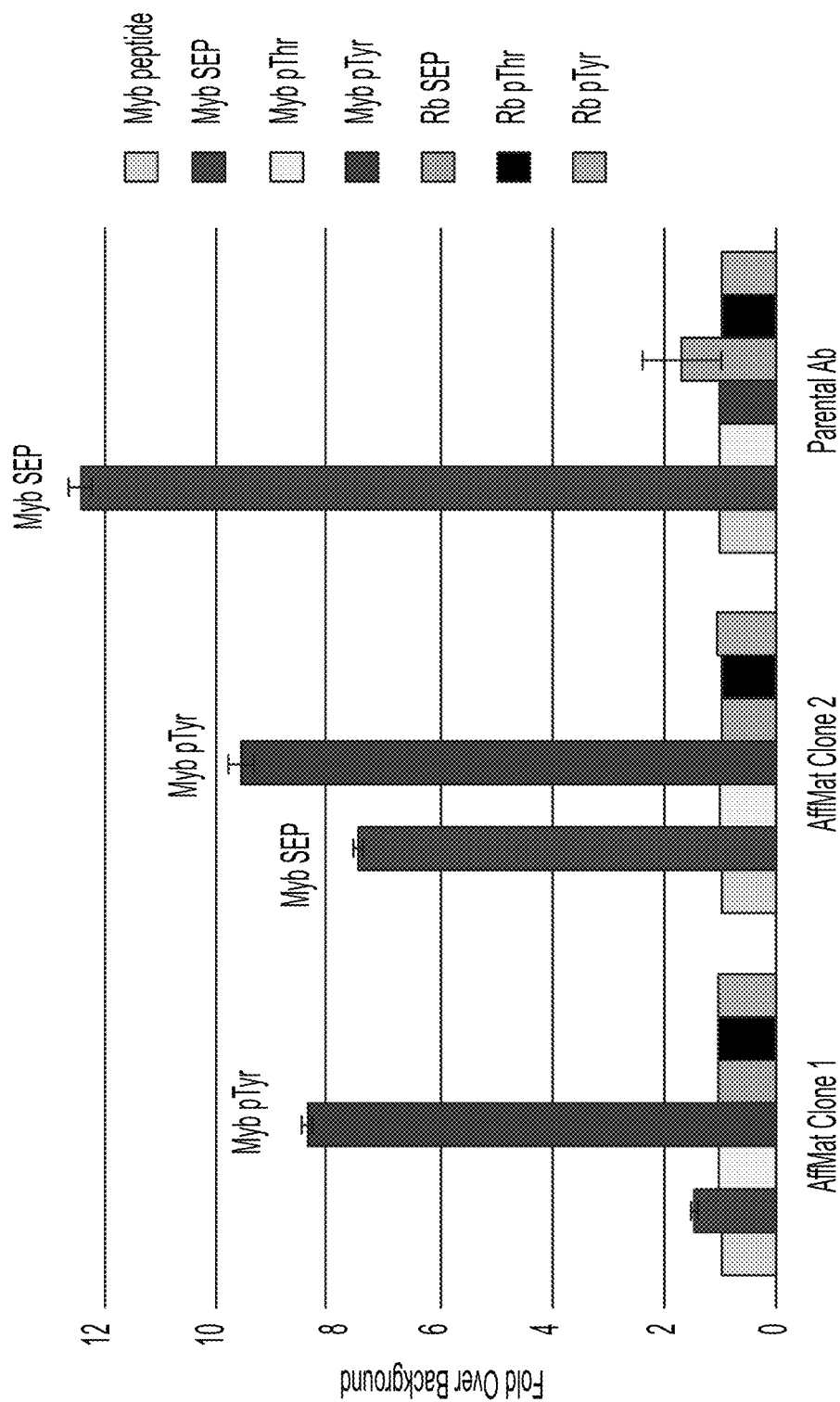
FIG. 6A is a bar chart showing changing glycol-specificity in vitro. An anti-phosphoserine Myb scFv was identified using phage display biopanned against a phosphoserine (SEP)-peptide. The parental clone was then affinity matured against the same peptide having the SEP amino acid substituted with a phosphor-tyrosine. Clones that bound to the pTyr peptide were then tested against Myb peptides that contained substituted pTyr and pThr and a scrambled irrelevant phosphorylated Rb peptide. One clone (clone 1) drifted from SEP-specific to pTyr-specific. The second clone (clone 2) bound to both SEP and pTyr, but not pThr.
Figure 6F:
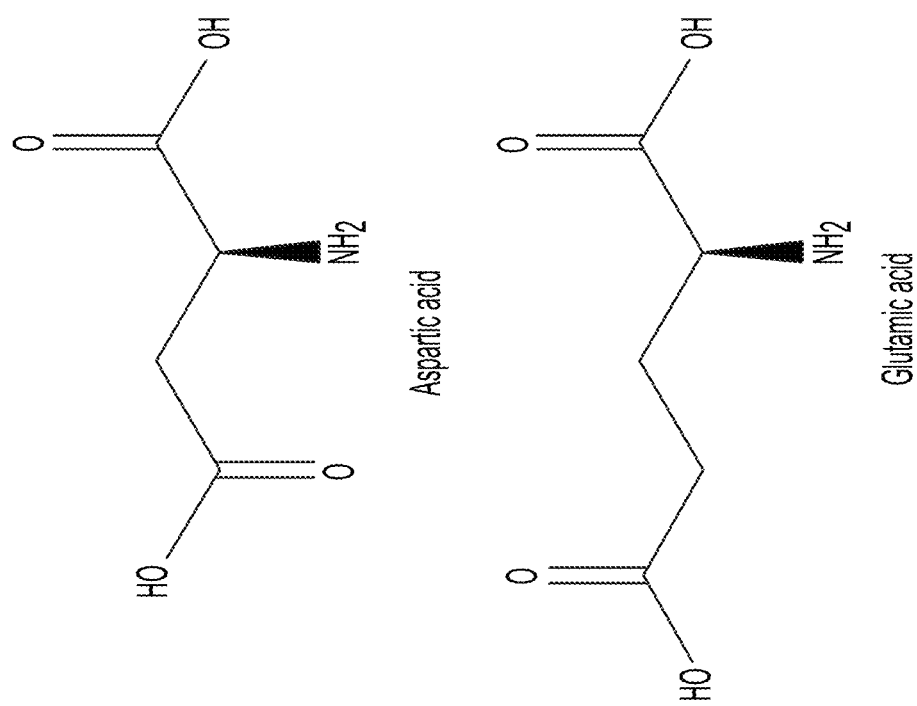
FIG. 6F illustrates the HIV MPER sequence and amino acids that mediate polymorphism-specific mAb binding in vivo. Example Polymorphism-specific mAbs to the HIV MPER sequence: KNEQELLELDKW ASSLWNWFNITNWLWYIKLF (SEQ ID NO:19). The polymorphism at the "D" position is highlighted. The difference between the Asp and Glu amino acids is a single carbon unit.
Figure 6G:
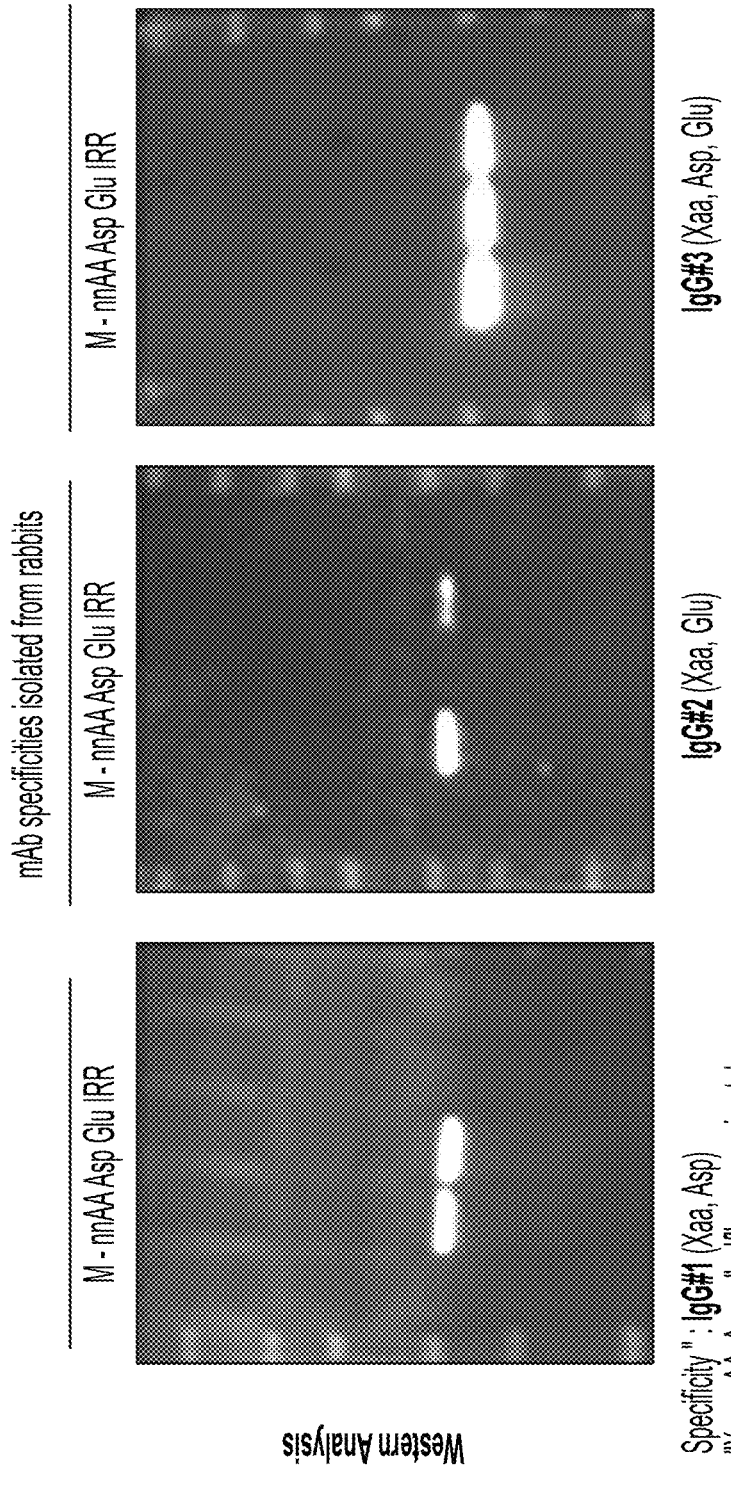
FIG. 6G is a series of immunoblots showing polymorphism-specific clones. Using ES/D we were able to clone IgG mAbs that were either nnAA+D (IgG #1)-, nnAA+E (IgG #2)- or, nnAA+D+E (IgG #3) specific. Experiments were performed in rabbits FIG. 7A, FIG. 7B, FIG. 7C.
Figure 7A:
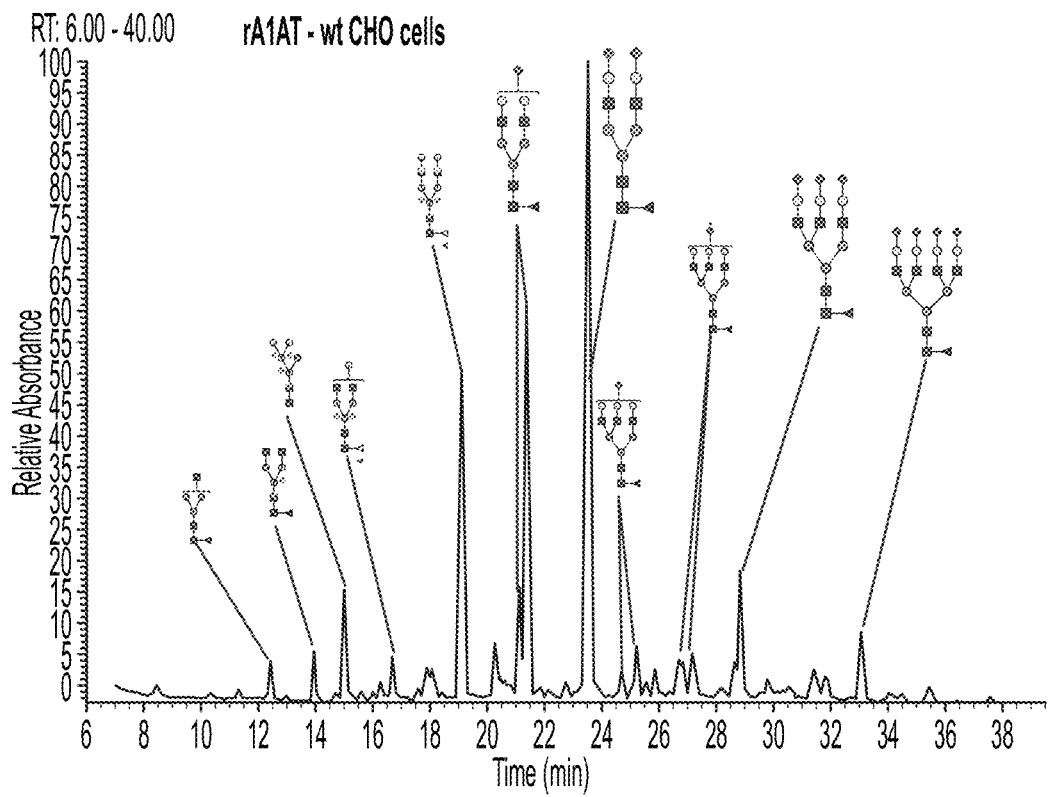
(FIG. 7A) Recombinant rhA1AT expressed in wt CHO, (FIG. 7B) plasma derived plA1AT, (FIG. 7C) Commercial Drug, (FIG. 7D) rA1AT from a geCHO line (non-fucosylated bi-antennary α2,6-sialylated N-glycoform).
Figure 7B:
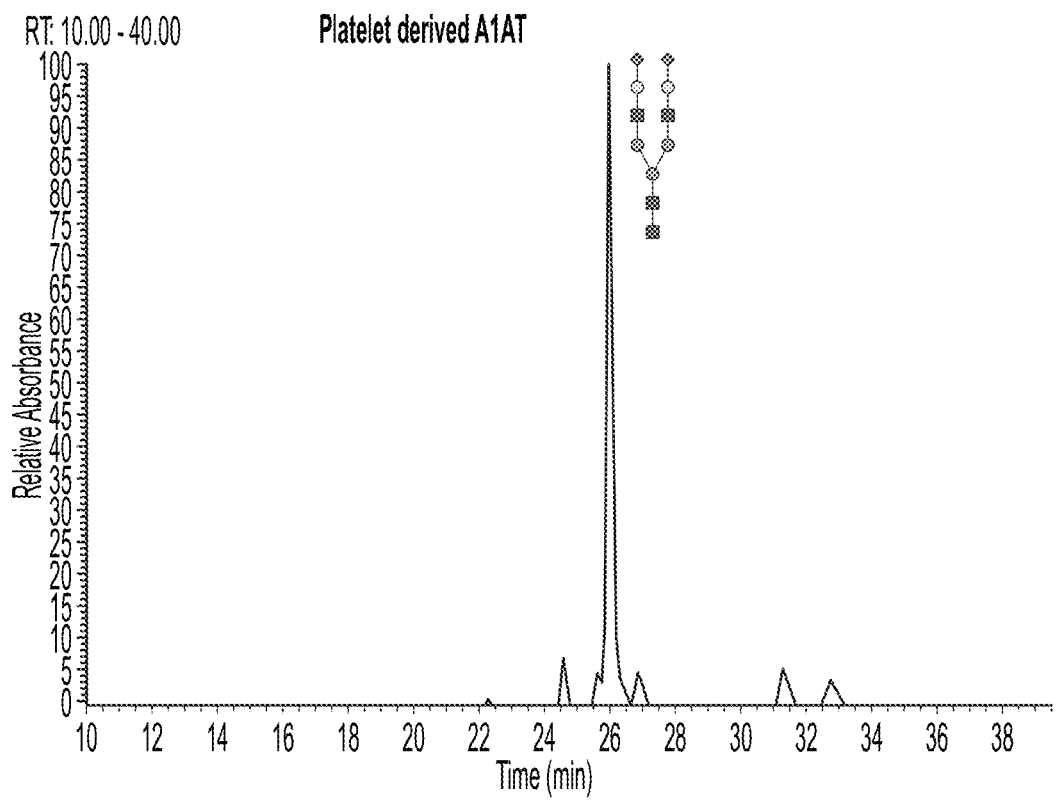
FIG. 7D illustrates rhA1AT expression in geCHO cells and analyzed by Mass Spectrometry.
Figure 7C:
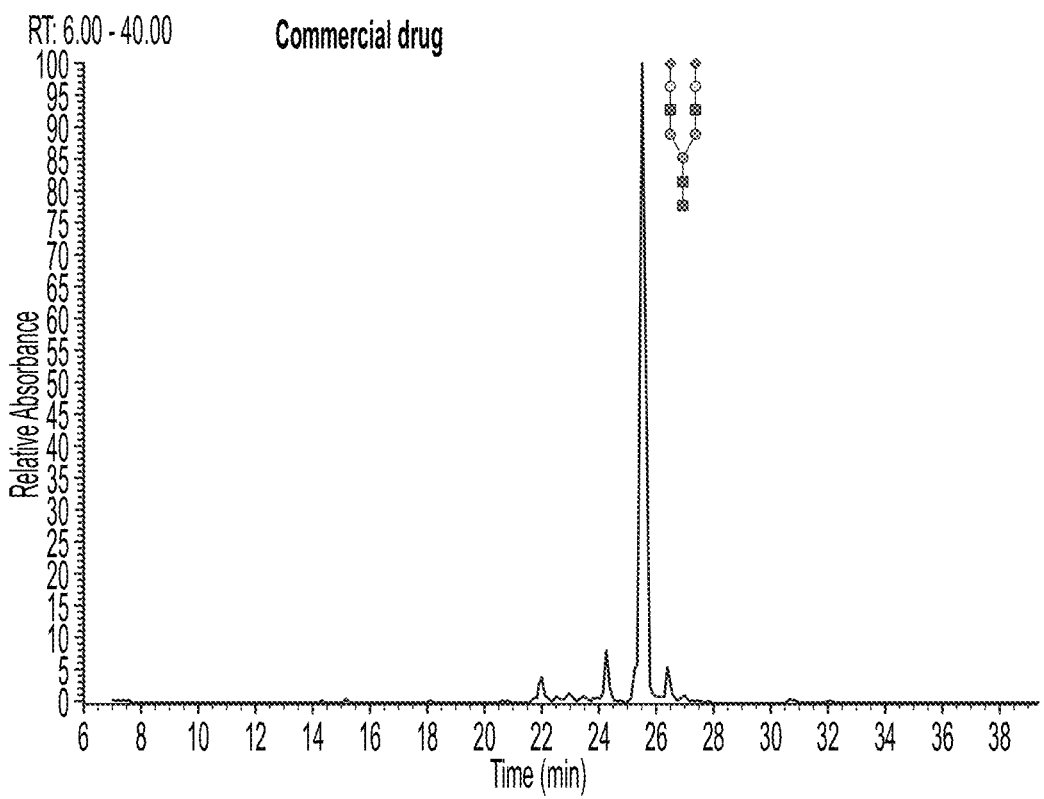
Figure 7D:
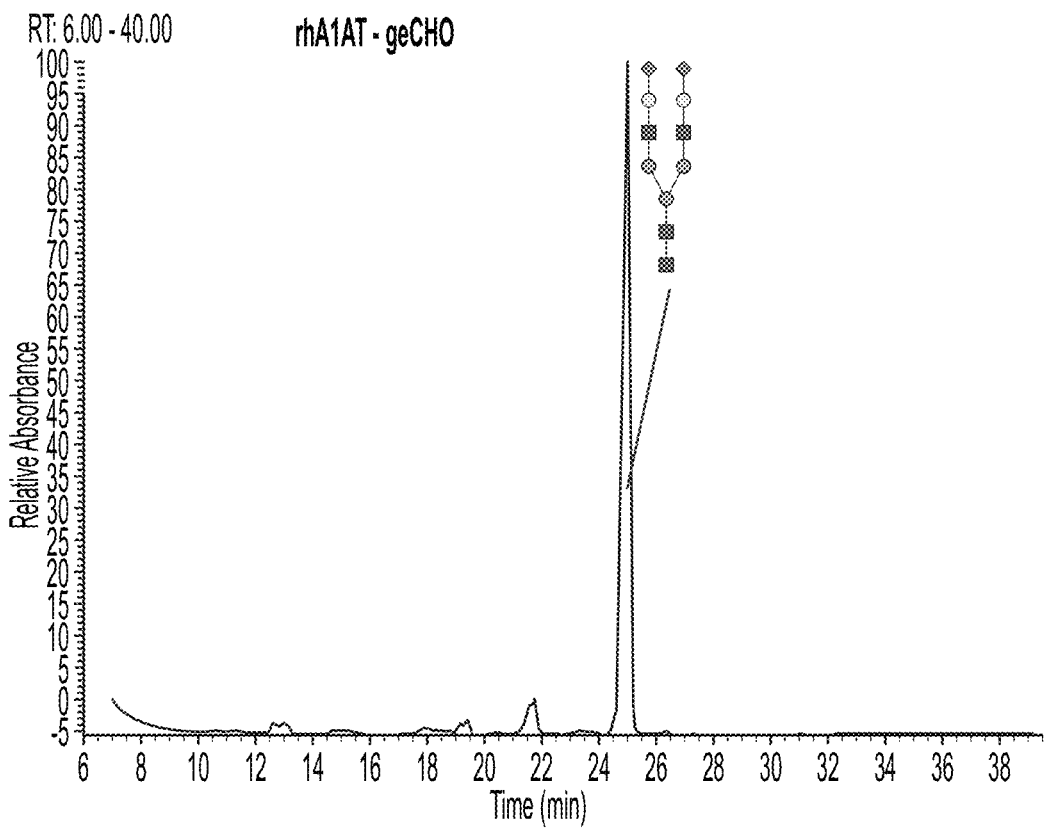

Conformational-dependent antibodies are examined in cleavage assays and pseudoviral neutralization assays for four subtypes of Ebola virus pseudoparticules, and Marburgvirus pseudoparticle. FIG. 5 shows the neutralization activities of monoclonal antibodies CA45 and KZ52 against a panel of pseudoparticles. Four subtypes of Ebola virus pseudoparticles (Zaire (EBOV), Sudan, Bundibugyo (BDBV) and Reston) and Marburg virus (MARV) pseudoparticle were examined. Ebola antibodies CA45 and KZ52 were used for the neutralization analysis at concentrations from 2.5 ug/ml to 19.5 ng/ml. PBS (not shown) and HCV E2 monoclonal antibody HC84.26 were used for negative controls.

EXAMPLE 6: EXPRESS, PURIFY, GLYCOPROFILE, AND QUANTIFY ACTIVITY OF RHA1ATS USING THE GECHO LINE. We use the geCHO system to generate A1AT protein with various types of glycosylation. Specifically, the glycoengineered CHO cell lines (geCHO) is used to produce a recombinant humanized A1AT (rhA1AT) with a human glycosylation pattern identical to the native A1AT from human plasma (FIGS. 7A-7D). The rhA1AT is identical in size, isoforms, and elastase inhibition activity as pdA1AT Specifically, we will express rhA1Ats-M351V/M358V (#2) and rhA1AT-M351V/M358V/L353A (#3), with rhA1AT with glycan-123 (#4) and rhA1AT with M351V/M358V/L353A and glycan-123 (#5). Column chromatography using FPLC us used for the purification. Glycosylation on purified protein is measured by mass spectrometry to ensure the retention of a glycosylation pattern mimicking pdA1AT.

EXAMPLE 7: DESIGN OF PEPTIDES FOR TARGET EPITOPES AND INITIAL NNAA PEPTIDE IMMUNIZATION. Epivolve uses a modified peptide for the initial discovery biopanning screens, and subsequent biopanning with the native peptide or protein (if available). We test three of the natively glycosylated sites (70, 107, 271) in A1AT. For each of the 3 chosen targeted sites (70, 107, 271) at positions −2, −1, 0, +1, +2 (where the amino acid that is glycosylated is position 0, listed in for the A1AT 70 position), peptides will be designed with around 6-7 common amino acids on both sides of a central targeted amino acid site. For any given site, the set of peptides will have a central nnAA. Peptide with a carboxyl terminal "-bio" are conjugated to streptavidin and used for biopan screening. Peptides with amino-terminal "-bio" are biotinylated and are used for ELISA analysis. To prevent end-terminal cross-binding, each of these peptides have short heterologous amino acid sequences flanking the targeted epitope. Flanking sequences on the first peptide consist of native sequences, the others are composed of varied orders of poly-gly and ser.

TABLE I

Example Peptide Set

| Pept | Sequence* | SEQ ID NO |
|---|---|---|
| 70-Nat | rgLAHQSNSTNIFfs-bio | 4 |
| 70-1 | gsLAHXSNSTNIFsg-bio | 5 |
| 70-2 | sgLAHQXNSTNIFgs-bio | 6 |
| 70-0 | ggLAHQSXSTNIFss-bio | 7 |
| 70+1 | SSLAHQSNXTNIFgg-bio | 8 |
| 70+2 | gLAHQSNSSXIFs-bio | 9 |
| 70-Nbio | b-LAHQSNSTNIFfs | 10 |
| 70-1bio | b-LAHXSNSTNIFSg | 11 |
| 70-2bio | b-LAHQXNSTNIFgs | 12 |
| 70-0bio | b-LAHQSXSTNIFss | 13 |
| 70+1bio | b-LAHQSNXTNIFgg | 14 |
| 70+2bio | b-LAHQSNSSXIFs | 15 |
| 107-Nat | ilEGLNFNLTEIPea-bio | 16 |
| 271-Nat | IlMKYLGNATAIFfl-bio | 17 |

*X = Modified amino acid

Figure 8:
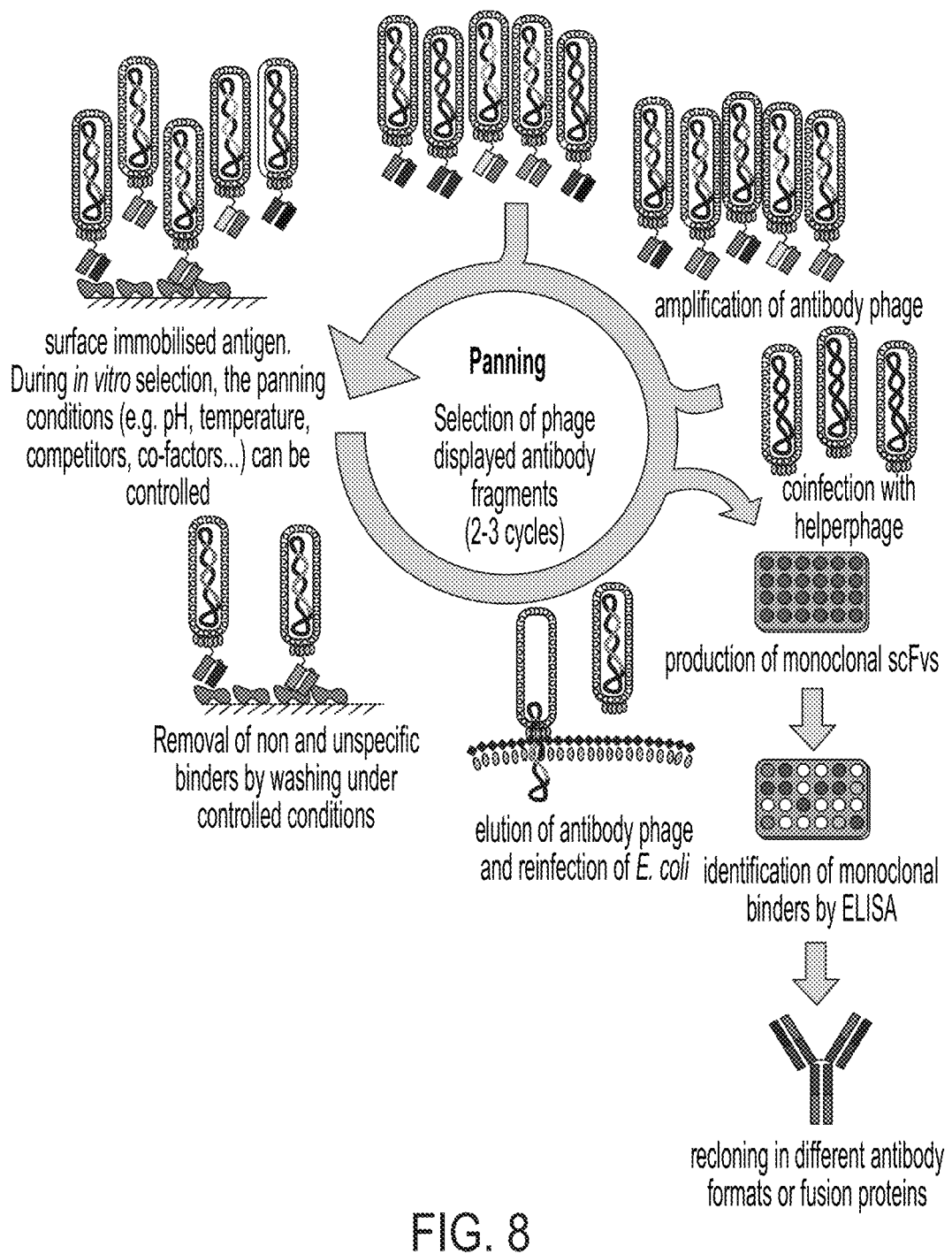
FIG. 8 illustrates how phage display can be used to discover Abs that can differentiate the state of glycosylation at a single amino acid site.
Figure 9:
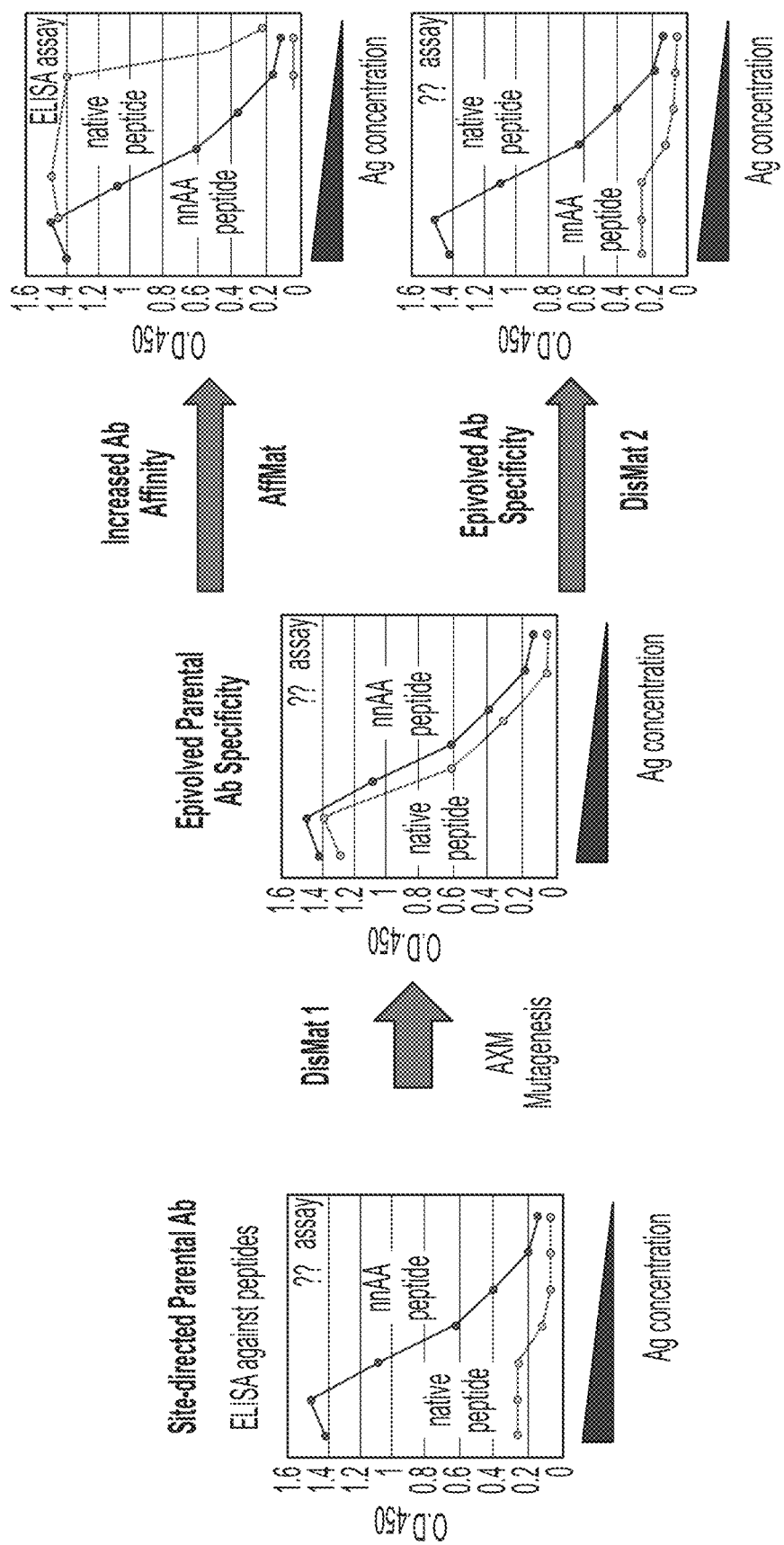
FIG. 9 shows naïve discovery biopanning, DisMat biopanning and AffMat biopanning.
Figure 10:
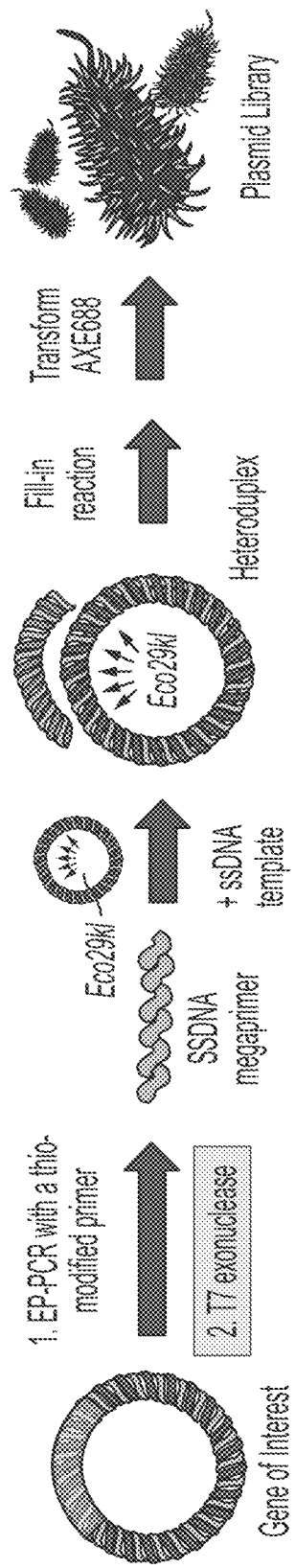
FIG. 10 illustrates the affinity maturation library construction approach. The template sequence is amplified under error-prone ("EP") PCR conditions using a reverse primer containing multiple phosphorothioate linkages on its 5' terminus. The resulting double-stranded DNA is treated with T7 exonuclease to selectively degrade the unmodified strand of the dsDNA molecule. The resulting single-stranded DNA, or 'megaprimer', is then annealed to the uracilated, circular, single-stranded phagemid DNA and used to prime in vitro synthesis by DNA polymerase. The ligated, heteroduplex product is then transformed into *E. coli* AXE688 cells, where the uracilated strand is cleaved in vivo by uracil N-glycosylase, favoring survival of the newly synthesized, recombinant strand containing the megaprimer. Also, Eco29kI is used to eliminate any clones that are not fully recombinant.

EXAMPLE 8: ISOLATION OF IGG ABS ABLE TO DISTINGUISH THE GLYCO-STATUS OF GLYCOSYLATED SITES. Phage display (FIG. 8) can be used to discover Abs that can differentiate the state of glycosylation at a single amino acid site. We can identify an Ab that only binds if the site is not glycosylated. And a second Ab type that will only bind to a glycosylated protein. We design sets of Epivolve peptides (see Table 1 for an example for the glycol-70 set). High titer phage libraries ($>10^{12}$) will be biopanned through several rounds against biotinylated peptides bound to a streptavidin bead or microtiter plate, for each round the substrate is washed under stringent conditions, which may also involve adding peptide to the wash buffer to remove non-specific and unwanted phage. After several rounds, any phage still bound is eluted from the substrate and transfected into E. coli for single colony isolation. ScFvs from single clones will be subcloned into IgG vectors and transfected into HEK Freestyle cells and the cells are incubated and cell-free supernatant collected after 6-12 days. The supernatants are validated against non-glycosylated A1AT from E. coli, and against appropriately glycol-modified A1AT obtained from plasma and geCHO cells. Data are collected and evaluated before moving on to each next step. If needed, as shown in FIGS. 6A-6G, we use AXM mutagenesis to increase the binding affinity and binding specificity of singled out clones. The IgGs from clones of interest are further scaled up for IgG expression and the IgG purified. The IgGs are biophysically characterized (at the least: specificity by ELISA assay, DNA sequencing, and kinetic.

TABLE 2

Comparison of Methods for Generating a Phage Library

| Method | *E. coli* strain TG1 | | *E. coli* strain AXE688 | |
|---|---|---|---|---|
| | Transformation Efficiency (cfu/µg) | % Recombinant | Transformation Efficiency (cfu/µg) | % Recombinant |
| Std Kunkel | $1.1 \times 10^9$ | 8 | $2.3 \times 10^8$ | 96 |
| Kunkel + RCA | ND | ND | $5 \times 10^9$ | 95 |

TABLE 3

Comparison of Mutagenesis Methods

| Mutagenesis Method | Transformants per Electroporation | Library Diversity | Mutation Rate |
|---|---|---|---|
| Standard Error Prone PCR | $1 \times 10^5$ | $7.5 \times 10^4$ | 1.1 |
| AXM Mutagenesis | $2.8 \times 10^8$ | $1.3 \times 10^8$ | 1.5 |

Example 9: Isolation of IgG Abs Able to Distinguish the Specific Glycan Type at the Glycosylation Site The gCHO system with our Epivolve method generates A1AT protein with differing, but specific glycosylation. We use Epivolve to derive affinity reagents that bind to the context sequence adjacent to the glycosylated site and can differentiate between the type of glycan present at that site. The experimental approach is similar to the previous example and uses the same experimental approach (FIG. 5).

What is claimed is:

1. An in vivo immunization method comprising:
   a. immunizing an animal at least once with a modified peptide having an amino acid sequence of about 10 to about 20 amino acids identical to an amino acid sequence of a protein of interest except wherein one internal native amino acid has been substituted with a non-native amino acid (nnAA), wherein the nnAA is a phosphorylated amino acid, an acetylated amino acid, an isocyanated amino acid, a sulfated amino acid, or a nitrated amino acid;
   b. boosting the animal at least once with a first unmodified peptide comprising a core amino acid sequence that is identical to the modified peptide of step (a), except wherein the nnAA has been substituted with the native amino acid, a first N-terminal amino acid sequence that is not native to the protein of interest, and a first C-terminal amino acid sequence that is not native to the protein of interest;
   c. cloning B-cells obtained from the animal; and
   d. identifying a B-cell clone of step (c) that produce an antibody that:
      i. binds to the first unmodified peptide and a second unmodified peptide comprising
         the core amino acid sequence of the first unmodified peptide,
         a second N-terminal amino acid sequence that is not native to the protein of interest, and
         a second C-terminal amino acid sequence that is not native to the protein of interest,
      wherein the first N-terminal amino acid sequence, the first C-terminal amino acid sequence, the second N-terminal amino acid sequence, and the second C-terminal amino acid sequences are different amino acid sequences.

2. The method of claim 1, wherein the first C-terminal amino acid sequence is 2 to 5 amino acids, the first N-terminal amino acid sequence is 2 to 5 amino acids, or a combination thereof.

3. The method of claim 1, further comprising identifying a B-cell clone that bind to the protein of interest.

4. The method of claim 1, wherein the second C-terminal amino acid sequence is 2 to 5 amino acids, the second N-terminal amino acid sequence is 2 to 5 amino acids, or a combination thereof.

5. The method of claim 1, wherein the animal is a human, a rabbit, a mouse, a rat, a goat, a cow, a pig, a camelid, or a chicken.

6. The method of claim 1, wherein the animal is a non-human animal that has a humanized immune system.

7. The method of claim 1, wherein the peptide is administered with an adjuvant.

8. The method of claim 7, wherein the adjuvant is Complete Freund's Adjuvant (CFA), Incomplete Freund's Adjuvant (IFA), aluminum, monophosphoryl lipid A (MPL) and aluminum salt (AS04), oil-in-water emulsion, oil-in-water emulsion of squalene (MF59), AS03 (Vitamin E, Surfactant polysorbate 80, and squalene), MPL and QS-21 in a liposome formulation (AS01), or cytosine phosphoguanine (CpG).

9. The method of claim 1, wherein the modified peptide is conjugated to one or more carriers and/or the first unmodified peptide is conjugated to one or more carriers.

10. The method of claim 1, wherein the nnAA is a non-synonymous amino acid.

11. The method of claim 1, wherein the nnAA is a phosphorylated amino acid.

12. The method of claim 1, wherein the nnAA is O-phosphoserine (SEP).

13. The method of claim 1, wherein the nnAA is phosphotyrosine.

14. The method of claim 1, wherein the nnAA is phosphothreonine.

15. The method of claim 1, wherein the N-terminal amino acid sequence or C-terminal amino acid sequence is SerGlySer, GlySerGly, GlyGlyGly, or SerSerSer.

* * * * *

```
                       SEQUENCE LISTING

Sequence total quantity: 20
SEQ ID NO: 1           moltype = AA  length = 10
FEATURE                Location/Qualifiers
source                 1..10
                       mol_type = protein
                       note = filovirus surface glycoprotein
                       organism = unidentified
SEQUENCE: 1
GVIHNSVLQV                                                           10

SEQ ID NO: 2           moltype = AA  length = 17
FEATURE                Location/Qualifiers
source                 1..17
                       mol_type = protein
                       note = filovirus surface glycoprotein
                       organism = unidentified
SEQUENCE: 2
IVNAQPKCNP NLHYWTT                                                   17

SEQ ID NO: 3           moltype = AA  length = 14
FEATURE                Location/Qualifiers
source                 1..14
                       mol_type = protein
                       note = filovirus surface glycoprotein
                       organism = unidentified
SEQUENCE: 3
YTEGLMHNQD GLIC                                                      14

SEQ ID NO: 4           moltype = AA  length = 15
FEATURE                Location/Qualifiers
source                 1..15
                       mol_type = protein
                       organism = synthetic construct
SITE                   15
                       note = C-terminus is conjugated to streptavidin
SEQUENCE: 4
RGLAHQSNST NIFFS                                                     15

SEQ ID NO: 5           moltype = AA  length = 15
FEATURE                Location/Qualifiers
source                 1..15
                       mol_type = protein
                       organism = synthetic construct
SITE                   15
                       note = C-terminus is conjugated to streptavidin
VARIANT                6
                       note = X is any natural or non-natural amino acid
SEQUENCE: 5
GSLAHXSNST NIFSG                                                     15
```

```
SEQ ID NO: 6              moltype = AA  length = 15
FEATURE                   Location/Qualifiers
source                    1..15
                          mol_type = protein
                          organism = synthetic construct
SITE                      15
                          note = C-terminus is conjugated to streptavidin
VARIANT                   7
                          note = X is any natural or non-natural amino acid
SEQUENCE: 6
SGLAHQXNST NIFGS                                                        15

SEQ ID NO: 7              moltype = AA  length = 15
FEATURE                   Location/Qualifiers
source                    1..15
                          mol_type = protein
                          organism = synthetic construct
SITE                      15
                          note = C-terminus is conjugated to streptavidin
VARIANT                   8
                          note = X is any natural or non-natural amino acid
SEQUENCE: 7
GGLAHQSXST NIFSS                                                        15

SEQ ID NO: 8              moltype = AA  length = 15
FEATURE                   Location/Qualifiers
source                    1..15
                          mol_type = protein
                          organism = synthetic construct
SITE                      15
                          note = C-terminus is conjugated to streptavidin
VARIANT                   9
                          note = X is any natural or non-natural amino acid
SEQUENCE: 8
SSLAHQSNXT NIFGG                                                        15

SEQ ID NO: 9              moltype = AA  length = 13
FEATURE                   Location/Qualifiers
source                    1..13
                          mol_type = protein
                          organism = synthetic construct
SITE                      13
                          note = C-terminus is conjugated to streptavidin
VARIANT                   10
                          note = X is any natural or non-natural amino acid
SEQUENCE: 9
GLAHQSNSSX IFS                                                          13

SEQ ID NO: 10             moltype = AA  length = 13
FEATURE                   Location/Qualifiers
source                    1..13
                          mol_type = protein
                          organism = synthetic construct
SITE                      1
                          note = N-terminus is biotinylated
SEQUENCE: 10
LAHQSNSTNI FFS                                                          13

SEQ ID NO: 11             moltype = AA  length = 13
FEATURE                   Location/Qualifiers
source                    1..13
                          mol_type = protein
                          organism = synthetic construct
SITE                      1
                          note = N-terminus is biotinylated
VARIANT                   4
                          note = X is any natural or non-natural amino acid
SEQUENCE: 11
LAHXSNSTNI FSG                                                          13

SEQ ID NO: 12             moltype = AA  length = 13
FEATURE                   Location/Qualifiers
source                    1..13
                          mol_type = protein
                          organism = synthetic construct
SITE                      1
                          note = N-terminus is biotinylated
VARIANT                   5
```

```
                        note = X is any natural or non-natural amino acid
SEQUENCE: 12
LAHQXNSTNI FGS                                                        13

SEQ ID NO: 13           moltype = AA   length = 13
FEATURE                 Location/Qualifiers
source                  1..13
                        mol_type = protein
                        organism = synthetic construct
SITE                    1
                        note = N-terminus is biotinylated
VARIANT                 6
                        note = X is any natural or non-natural amino acid
SEQUENCE: 13
LAHQSXSTNI FSS                                                        13

SEQ ID NO: 14           moltype = AA   length = 13
FEATURE                 Location/Qualifiers
source                  1..13
                        mol_type = protein
                        organism = synthetic construct
SITE                    1
                        note = N-terminus is biotinylated
VARIANT                 7
                        note = X is any natural or non-natural amino acid
SEQUENCE: 14
LAHQSNXTNI FGG                                                        13

SEQ ID NO: 15           moltype = AA   length = 12
FEATURE                 Location/Qualifiers
source                  1..12
                        mol_type = protein
                        organism = synthetic construct
SITE                    1
                        note = N-terminus is biotinylated
VARIANT                 9
                        note = X is any natural or non-natural amino acid
SEQUENCE: 15
LAHQSNSSXI FS                                                         12

SEQ ID NO: 16           moltype = AA   length = 15
FEATURE                 Location/Qualifiers
source                  1..15
                        mol_type = protein
                        organism = synthetic construct
SITE                    15
                        note = C-terminus is conjugated to streptavidin
SEQUENCE: 16
ILEGLNFNLT EIPEA                                                      15

SEQ ID NO: 17           moltype = AA   length = 15
FEATURE                 Location/Qualifiers
source                  1..15
                        mol_type = protein
                        organism = synthetic construct
SITE                    15
                        note = C-terminus is conjugated to streptavidin
SEQUENCE: 17
LLMKYLGNAT AIFFL                                                      15

SEQ ID NO: 18           moltype = AA   length = 28
FEATURE                 Location/Qualifiers
source                  1..28
                        mol_type = protein
                        organism = synthetic construct
SEQUENCE: 18
HLLIRKLPFS RLAAEAFLVH LFEDAYLL                                         28

SEQ ID NO: 19           moltype = AA   length = 32
FEATURE                 Location/Qualifiers
source                  1..32
                        mol_type = protein
                        organism = synthetic construct
SEQUENCE: 19
KNEQELLELD KWASSLWNWF NITNWLWYIK LF                                    32

SEQ ID NO: 20           moltype = AA   length = 31
FEATURE                 Location/Qualifiers
source                  1..31
```

-continued

```
                        mol_type = protein
                        organism = synthetic construct
VARIANT                 10
                        note = X is D or E
SEQUENCE: 20
KNEQELLELX KWASLWNWFN ITNWLWYIKL F                              31
```